US012794169B2

(12) United States Patent
(10) Patent No.: US 12,794,169 B2
(45) Date of Patent: Nov. 10, 2026

Akaike et al.

(54) ELECTRICAL CONNECTOR

(71) Applicant: MITSUMI ELECTRIC CO., LTD., Tokyo (JP)

(72) Inventors: Takahiro Akaike, Tokyo (JP); Takashi Kawasaki, Tokyo (JP); Isao Suzuki, Tokyo (JP); Hiroyuki Sadohara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 226 days.

(21) Appl. No.: 18/404,632

(22) Filed: Jan. 4, 2024

(65) Prior Publication Data

US 2024/0258737 A1 Aug. 1, 2024

(30) Foreign Application Priority Data

Jan. 30, 2023 (JP) ................................ 2023-011653

(51) Int. Cl.

*H01R 13/502* (2006.01)
*H01R 13/04* (2006.01)

(Continued)

(52) U.S. Cl.

CPC ........... *H01R 13/502* (2013.01); *H01R 13/04* (2013.01); *H01R 13/42* (2013.01); *H01R 13/639* (2013.01);

(Continued)

(58) Field of Classification Search

CPC ...... H01R 13/502; H01R 13/04; H01R 13/42; H01R 13/639; H01R 12/716; H01R 24/60; H01R 2103/00

(Continued)

(56) References Cited

U.S. PATENT DOCUMENTS 5,453,016 A * 9/1995 Clark .................. H01R 12/724 439/79
6,109,933 A * 8/2000 Lenoir ............... H01R 13/6585 439/943

(Continued)

FOREIGN PATENT DOCUMENTS

JP 2023008100 A 1/2023

OTHER PUBLICATIONS

Japan Patent Office, Office Action issued in Application No. 2023-011653, Sep. 29, 2026, 8 pages. (Submitted with Machine Translation).

*Primary Examiner* — Harshad C Patel
(74) *Attorney, Agent, or Firm* — McCoy Russell LLP

(57) ABSTRACT

An electrical connector includes a pair of contact pins and an insulating housing for containing the pair of contact pins therein. The contact pin includes a horizontally extending portion extending in an insertion and extraction direction of the mating connector and having a pair of surfaces, facing each other. The housing includes a cylindrical portion linearly extending in the insertion and extraction direction of the mating connector and containing the horizontally extending portion therein, and a pair of insertion holes passing through the cylindrical portion in the insertion and extraction direction of the mating connector and into which the horizontally extending portions of the pair of contact pins are respectively inserted. Each of the pair of insertion holes includes a first wall surface, a second wall surface, and a flat receiving portion formed on the first wall surface.

8 Claims, 35 Drawing Sheets

(51) Int. Cl.
*H01R 13/42* (2006.01)
*H01R 13/639* (2006.01)
*H01R 12/71* (2011.01)
*H01R 24/60* (2011.01)
*H01R 103/00* (2006.01)

(52) U.S. Cl.
CPC ............ *H01R 12/716* (2013.01); *H01R 24/60* (2013.01); *H01R 2103/00* (2013.01)

(58) Field of Classification Search
USPC ........................................................... 439/78
See application file for complete search history.

(56) References Cited

U.S. PATENT DOCUMENTS

| | | | | |
|---|---|---|---|---|
| 6,319,075 | B1 * | 11/2001 | Clark | H01R 13/11<br>439/825 |
| 6,860,765 | B1 * | 3/2005 | Spink, Jr. | H01R 12/716<br>439/83 |
| 8,092,235 | B2 * | 1/2012 | Frantum, Jr. | H01R 12/724<br>439/78 |
| 10,879,633 | B2 * | 12/2020 | Fu | H01R 12/57 |
| 11,764,525 | B2 * | 9/2023 | Endo | H01R 24/40<br>439/578 |
| 11,855,394 | B2 * | 12/2023 | Blakborn | H01R 13/6587 |
| 11,909,151 | B2 * | 2/2024 | Endo | H01R 9/0518 |
| 12,731,926 | B2 | 9/2026 | Suzuki et al. | |
| 2021/0408740 | A1 | 12/2021 | Blakborn | |
| 2024/0213725 | A1 * | 6/2024 | Endo | H01R 13/41 |
| 2024/0405491 | A1 * | 12/2024 | Yamada | H01R 12/7005 |
| 2024/0429635 | A1 * | 12/2024 | Akaike | H01R 13/04 |

* cited by examiner

ELECTRICAL CONNECTOR

CROSS-REFERENCE TO RELATED APPLICATION

The present application claims priority from Japanese Patent Application No. 2023-11653 filed on Jan. 30, 2023. The entire contents of the above-listed application are hereby incorporated by reference for all purposes.

TECHNICAL FIELD

The present disclosure generally relates to electrical connectors, in particular to an electrical connector used for providing a coaxial connection with a coaxial cable.

BACKGROUND ART

In order to provide an electrical connection between an electronic device and another electronic device through a cable, a combination of a receptacle connector and a plug connector has been widely used. Further, an amount of data transmitted from the electronic device to the other electronic device through the cable has increased as processing capacity of the electronic devices has been improved in recent years. In order to transmit a large amount of data in a short time, it is necessary to transmit a high frequency signal through the cable. Thus, there are needs of improving signal transmission characteristics of the cable, particularly, signal transmission characteristics of the cable in a high frequency band. In order to address such needs, a coaxial cable having superior signal transmission characteristics in the high frequency band has been widely used. As is well known, the coaxial cable has a coaxial structure in which a core wire for transmitting a signal, an inner insulator layer covering the core wire, an outer conductor layer (a braid layer) covering the inner insulator layer and serving as a ground earth when the signal is transmitted and a shield for preventing leak of the signal to the outside and penetration of radio waves from the outside, and an outer insulator layer covering the outer conductor layer are concentrically arranged.

In order to provide a coaxial connection with the above-mentioned coaxial cable, there has been widely used an electrical connector including a contact pin which should be electrically connected to the core wire of the coaxial cable and an insulating housing covering the contact pin. For example, patent document 1 discloses a housing 10 and a contact pin 11 typically used in the above-mentioned electrical connector as shown in FIG. 1. The housing 10 is an L-shaped member including a cylindrical portion 101 extending in a longitudinal direction (the Z direction) thereof and a downwardly extending portion 102 extending from a base end portion of the cylindrical portion 101 toward the lower side. A pair of insertion holes 103 are formed in the cylindrical portion 101 of the housing 10 so as to pass through the cylindrical portion 101 in the longitudinal direction (the Z direction). A wall portion 104 extending in the longitudinal direction is formed between the pair of insertion holes 103 so as to separate the pair of insertion holes 103 from each other. FIG. 2 is a perspective view of the contact pins 11. FIG. 3 is another perspective view of the housing 10 and the contact pin 11 shown in FIG. 1 viewed from another angle.

As shown in FIG. 2, the contact pin 11 includes a horizontally extending portion 111 which linearly extends in the longitudinal direction and is held in the cylindrical portion 101 of the housing 10, a contact portion 112 which protrudes from a tip end portion of the horizontally extending portion 111 toward the tip side and should be contacted with a corresponding contact pin of a mating connector, a connection portion 113 which is curved from a base end portion of the horizontally extending portion 111 so as to extend toward the lower side, a downwardly extending portion 114 which extends from a lower end portion of the connection portion 113 toward the lower side and a terminal portion 115 which is formed at a lower end portion of the downwardly extending portion 114 and should be connected to a corresponding terminal of a circuit board.

As shown in FIG. 3, the contact pin 11 is inserted into the insertion hole 103 from the base side of the housing 10. When insertion of the contact pin 11 into the insertion hole 103 is completed, the horizontally extending portion 111 of the contact pin 11 is held in the cylindrical portion 101 of the housing 10. In a state that the contact pin 11 is held in the cylindrical portion 101, a gap exists between the horizontally extending portion 111 and an inner peripheral surface of the insertion hole 103. By providing the gap between the inner peripheral surface of the insertion hole 103 and the contact pin 11, the contact pin 11 can be inserted into the insertion hole 103 even if a size of the contact pin 11 changes due to manufacturing tolerance of the contact pin 11.

However, if the gap exists between the inner peripheral surface of the insertion hole 103 and the contact pin 11, the contact pin 11 rattles in the insertion hole 103 and a holding position of the contact pin 11 becomes unstable. Thus, a separation distance between a pair of contact pins 11 in the housing 10 cannot be kept constant. As a result, there is a problem that the signal transmission characteristics of the electrical connector, especially the signal transmission characteristics of the electrical connector in the high frequency band, deteriorate.

RELATED ART DOCUMENT

Patent Document

Patent document 1: US 2021/0408740 A1

SUMMARY OF THE INVENTION

Problem to be Solved by the Invention

The present disclosure has been made in view of the above-mentioned problem. Accordingly, it is an object of the present disclosure to keep the separation distance between the pair of contact pins in the housing constant to stabilize holding positions of the pair of contact pins in the insertion holes of the housing, thereby maintaining and improving high signal transmission characteristics of the electrical connector.

Means for Solving the Problems

The above object is achieved by the present disclosures defined in the following (1) and (2).

(1) An electrical connector which can be coupled with a mating connector inserted from a tip side thereof, comprising:

a pair of contact pins; and an insulating housing for containing the pair of contact pins therein in a state that the pair of contact pins are insulated from each other;

wherein each of the pair of contact pins includes a horizontally extending portion which is located in the housing and linearly extends in an insertion and extraction direction of the mating connector, wherein the horizontally extending portion has a pair of surfaces facing each other, wherein the housing includes:

a cylindrical portion which linearly extends in the insertion and extraction direction of the mating connector and contains the horizontally extending portions of the pair of contact pins therein, and a pair of rectangular insertion holes which pass through the cylindrical portion in the insertion and extraction direction of the mating connector and into which the horizontally extending portions of the pair of contact pins are respectively inserted, wherein each of the pair of insertion holes includes:

a first wall surface which faces one surface of the pair of surfaces of the horizontally extending portion, a second wall surface which faces another surface of the pair of surfaces of the horizontally extending portion, and a flat receiving portion which is formed on the first wall surface, and wherein the second wall surface of the insertion hole presses the other surface of the horizontally extending portion of the contact pin corresponding to the insertion hole toward an inner side of the insertion hole, thereby pressing the contact pin corresponding to the insertion hole onto the receiving portion of the insertion hole.

(2) An electrical connector which can be coupled with a mating connector inserted from a tip side thereof, comprising:

a pair of contact pins; and an insulating housing for containing the pair of contact pins therein in a state that the pair of contact pins are insulated from each other;

wherein each of the pair of contact pins includes a horizontally extending portion which is located in the housing and linearly extends in an insertion and extraction direction of the mating connector, wherein the horizontally extending portion has a pair of surfaces facing each other, wherein the housing includes:

a cylindrical portion which linearly extends in the insertion and extraction direction of the mating connector and contains the horizontally extending portions of the pair of contact pins therein, and a pair of rectangular insertion holes which pass through the cylindrical portion in the insertion and extraction direction of the mating connector and into which the horizontally extending portions of the pair of contact pins are respectively inserted, wherein each of the pair of insertion holes includes:

a first wall surface which faces one surface of the pair of surfaces of the horizontally extending portion, and a second wall surface which faces another surface of the pair of surfaces of the horizontally extending portion, and wherein the second wall surface of the insertion hole presses the other surface of the horizontally extending portion of the corresponding contact pin corresponding to the insertion hole toward an inner side of the insertion hole, thereby pressing the contact pin corresponding to the insertion hole onto the first wall surface of the insertion hole.

Effect of the Invention

In the present disclosure, each of the pair of the insertion holes of the housing of the electrical connector includes the first wall surface facing the one surface of the horizontally extending portion of the contact pin, the second wall surface facing the other surface of the horizontally extending portion and the flat receiving portion formed on the first wall surface. In a state that the cylindrical portion of the housing is inserted into an insertion hole of a shell and the housing is held by the shell, the second wall surface of the insertion hole of the housing presses the other surface of the horizontally extending portion of the contact pin corresponding to the insertion hole and presses the horizontally extending portion of the contact pin corresponding to the insertion hole onto the receiving portion. With this configuration, the pair of contact pins are firmly sandwiched in the insertion holes of the housing. As a result, the holding positions of the pair of contact pins in the insertion holes of the housing are stabilized. Therefore, it is possible to keep the separation distance between the pair of contact pins constant, thereby maintaining and improving the high signal transmission characteristics of the electrical connector.

DETAILED DESCRIPTION

Figure 1:
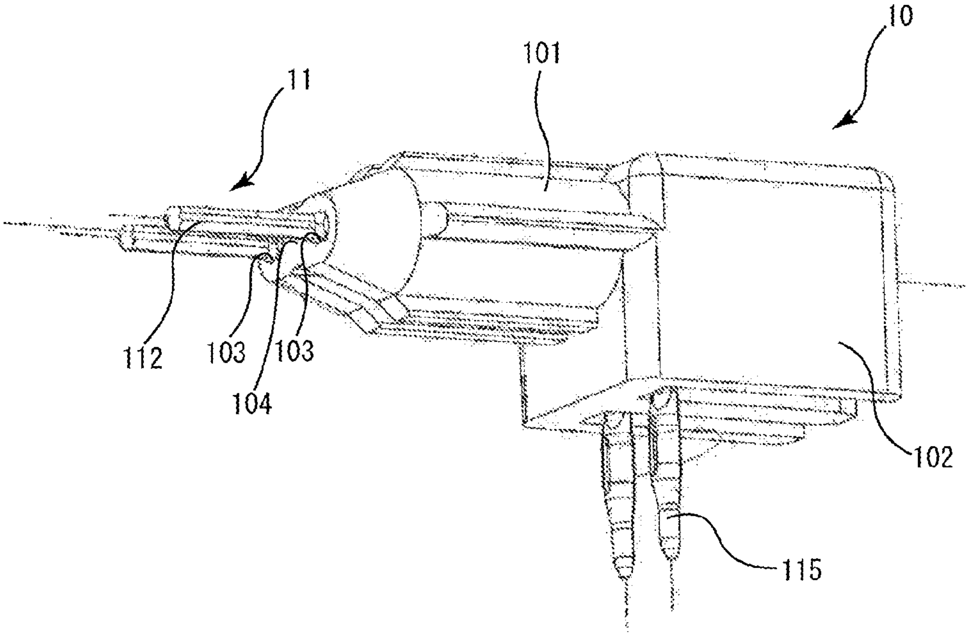
Prior art Fig. 1
FIG. 1 is a perspective view showing a housing and a contact pin typically used in a conventional electrical connector.
Figure 2:
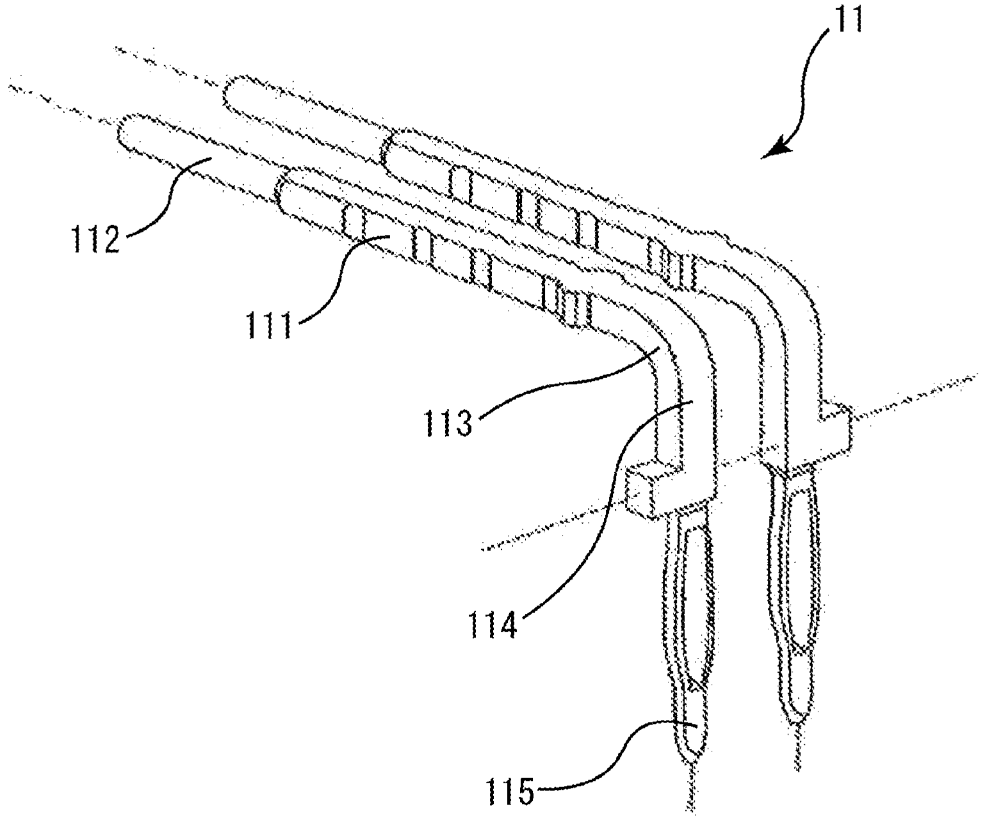
Prior art Fig. 2
FIG. 2 is a perspective view of the contact pins shown in FIG. 1.
Figure 3:
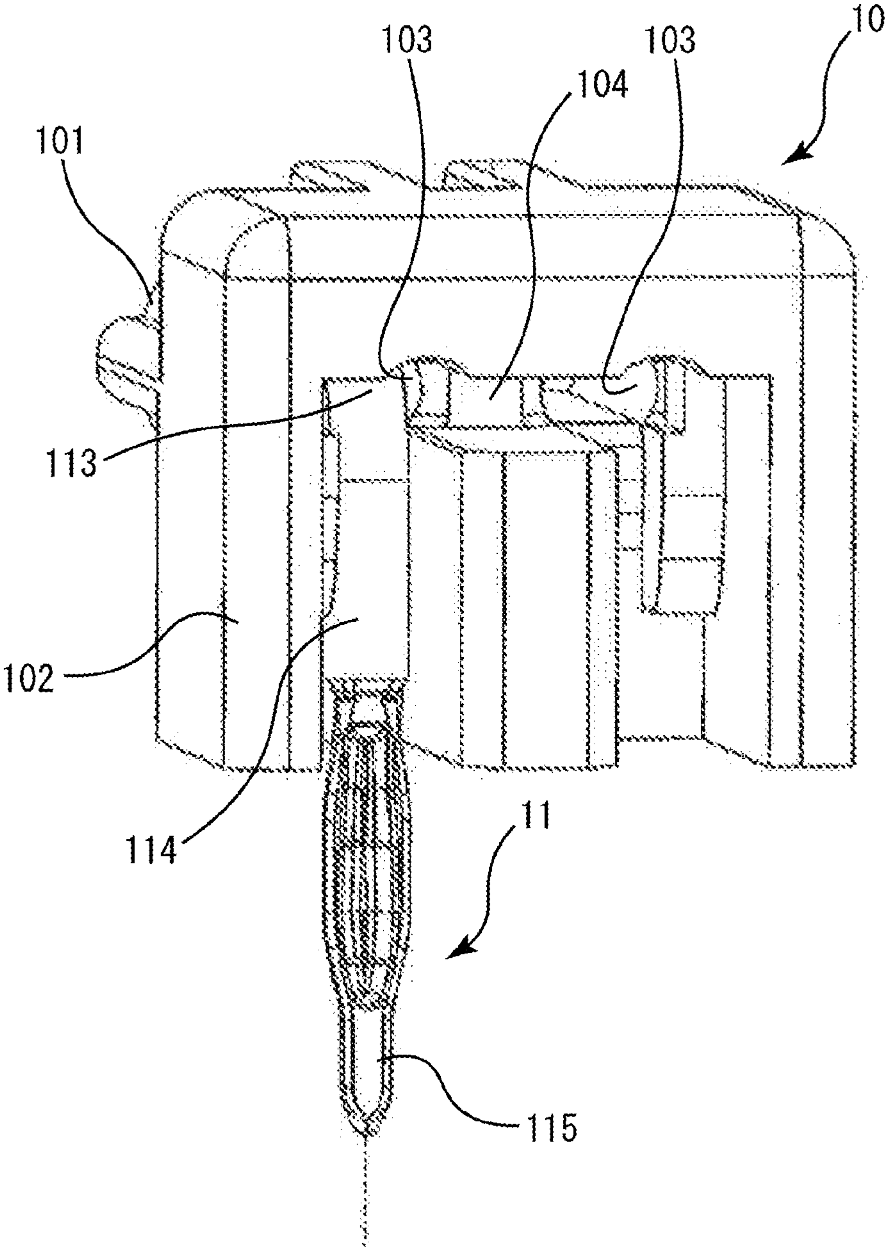
Prior art Fig. 3
FIG. 3 is another perspective view of the contact pin and the housing shown in FIG. 1 viewed from another angle.

Hereinafter, an electrical connector of the present disclosure will be described with reference to a preferred embodiment shown in the accompanying drawings. Note that each of the figures referred in the following description is a schematic diagram prepared for explaining the present disclosure. A dimension (such as a length, a width and a thickness) of each component shown in the drawings is not necessarily identical to an actual dimension. Further, the same reference numbers are used throughout the drawings to refer to the same or similar elements. In the following description, the positive direction of the Z-axis in each figure may be referred to as "a tip side" or "a front side", the negative direction of the Z-axis in each figure may be referred to as "a base side" or "a rear side", the positive direction of the Y-axis in each figure may be referred to as "an upper side", the negative direction of the Y-axis in each figure may be referred to as "a lower side", the positive direction of the X-axis in each figure may be referred to as "a near side" and the negative direction of the X-axis in each figure may be referred to as "a far side". Further, the Z direction may be referred to as "an insertion and extraction direction of a mating connector", the Y direction may be referred to as "a height direction" and the X direction may be referred to as "a width direction".

Figure 4:
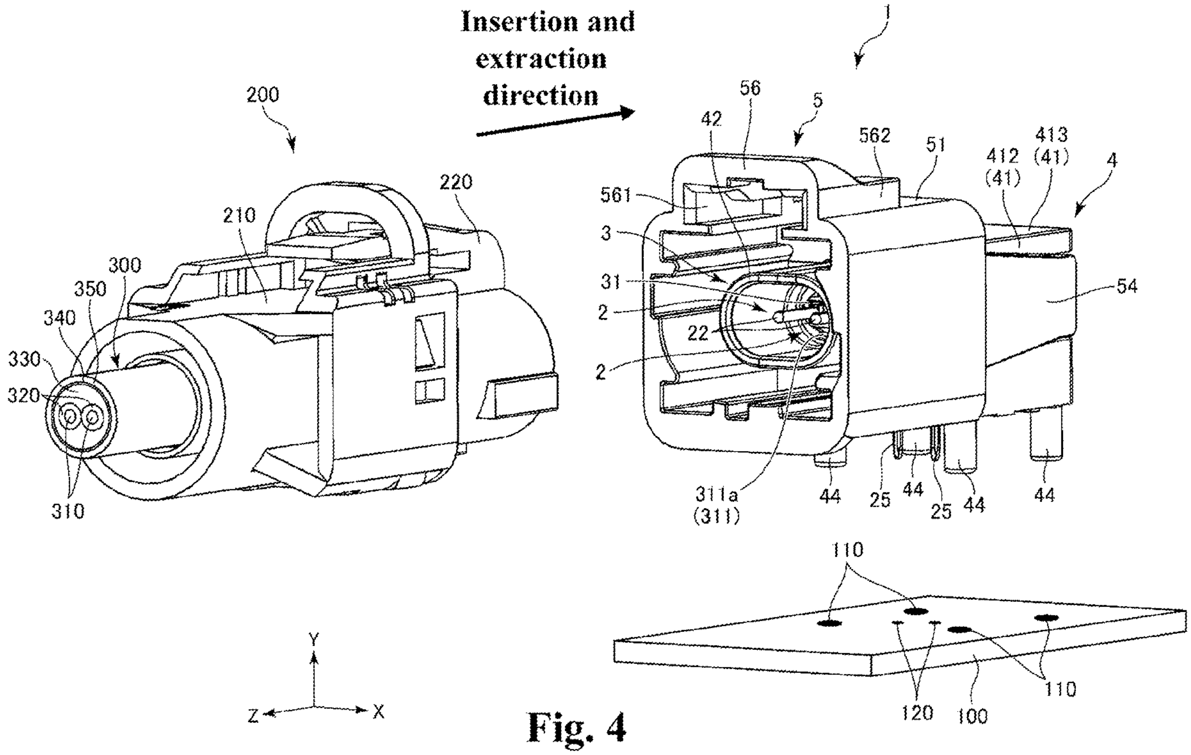
FIG. 4 is a perspective view showing an electrical connector of the present disclosure, a circuit board on which the electrical connector of the present disclosure is to be mounted and a mating connector which should be coupled with the electrical connector of the present disclosure.
Figure 5:
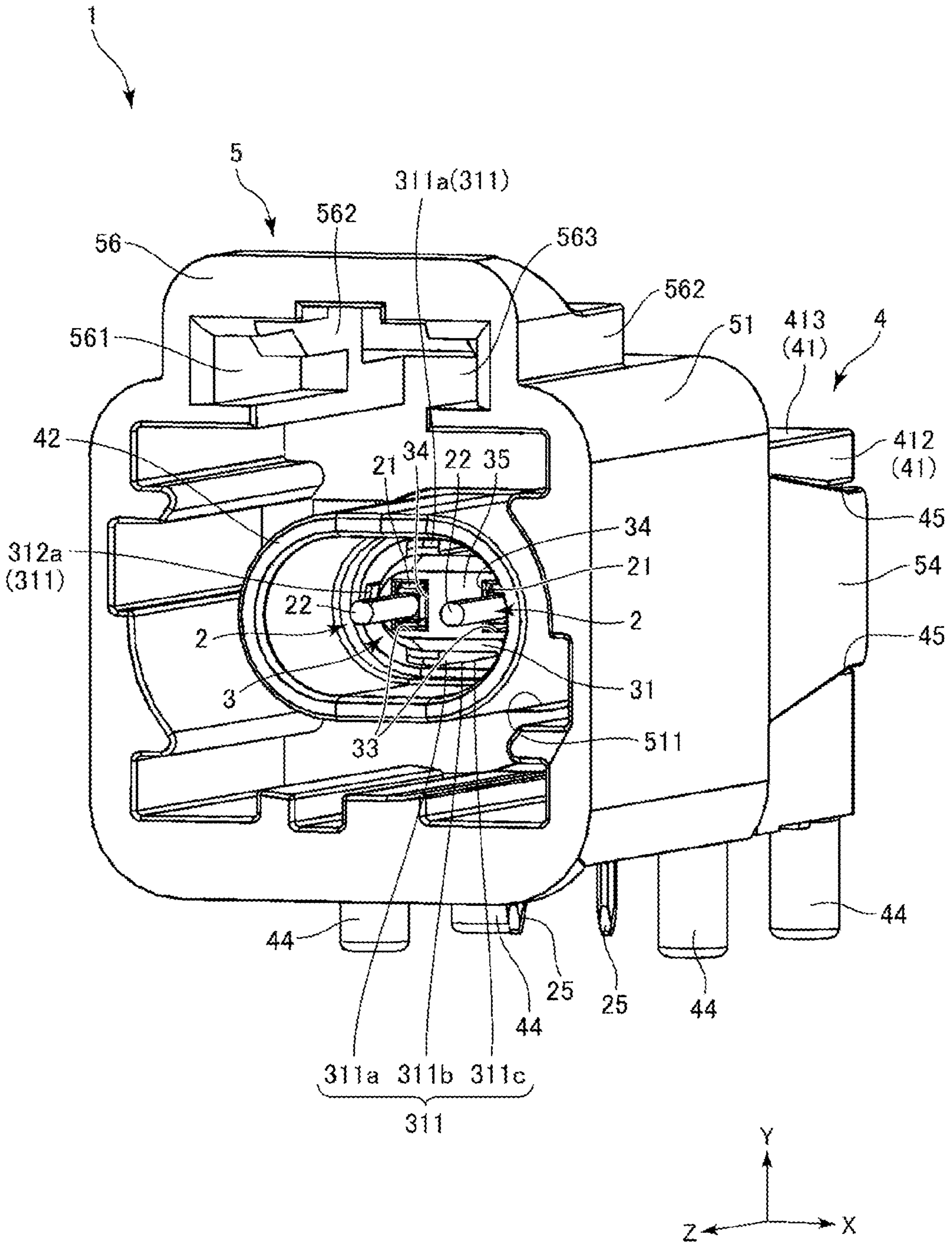
FIG. 5 is a perspective view of the electrical connector shown in FIG. 4.
Figure 6:
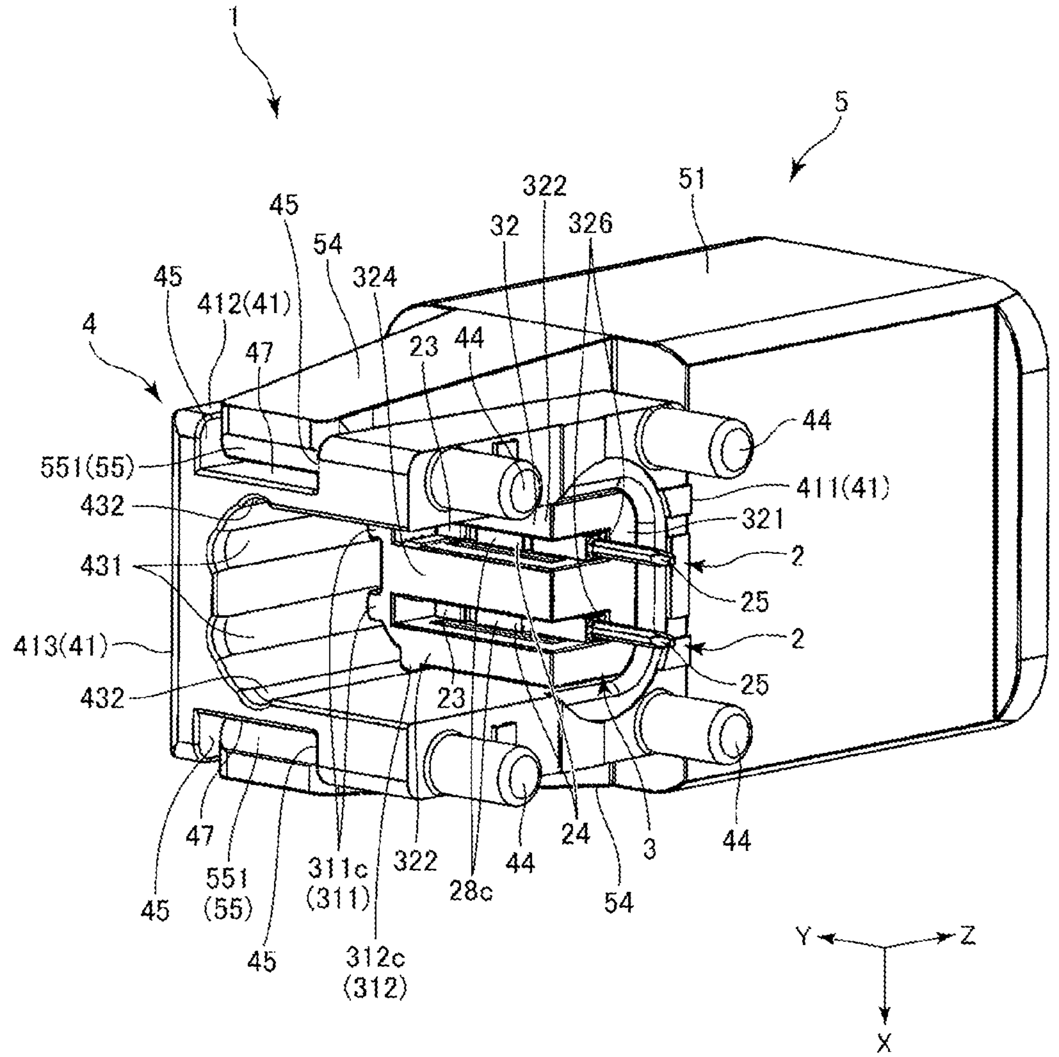
FIG. 6 is another perspective view of the electrical connector shown in FIG. 4 viewed from another angle.
Figure 7:
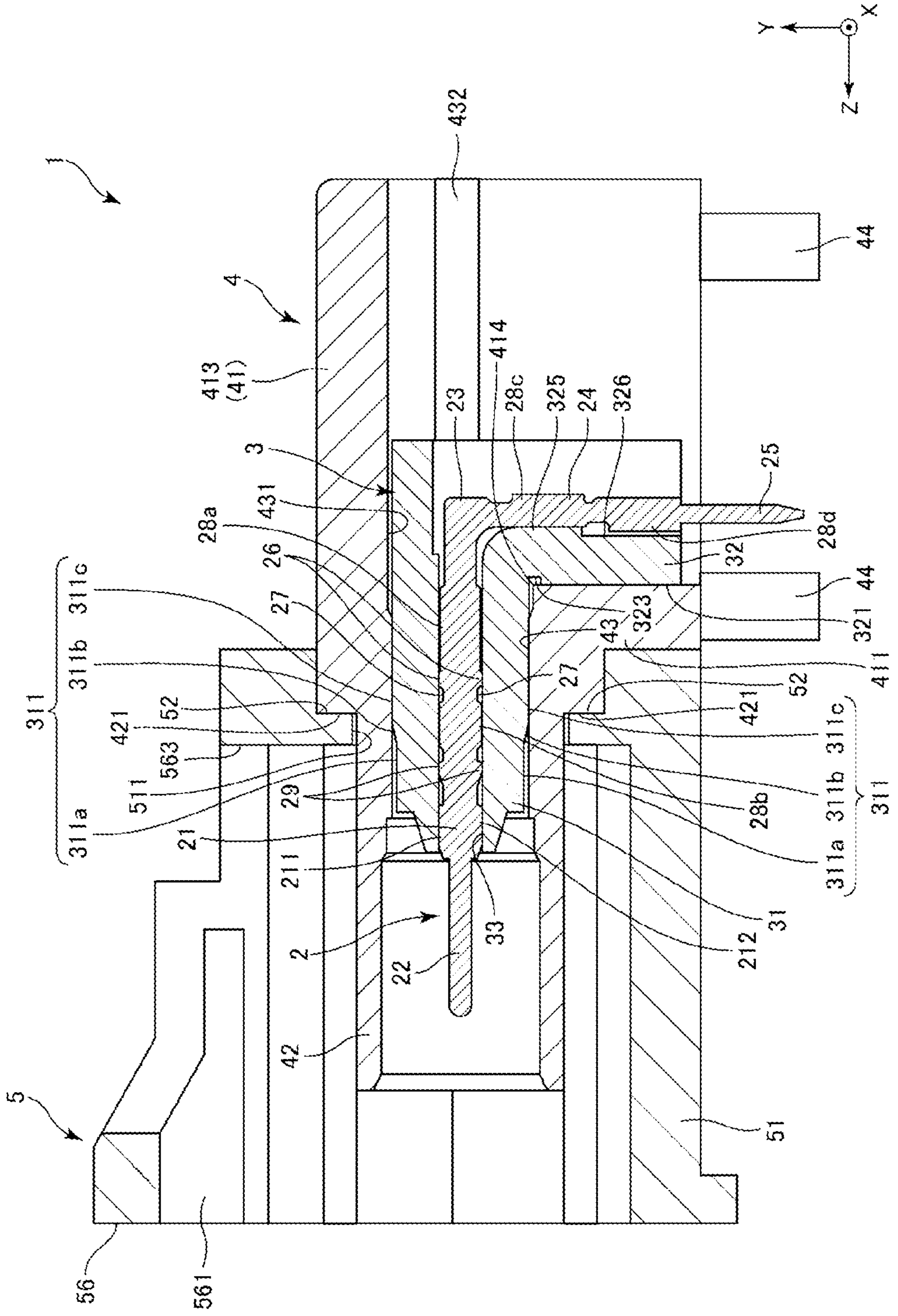
FIG. 7 is a YZ plane cross-sectional view containing an insertion hole of a housing of the electrical connector shown in FIG. 4.
Figure 8:
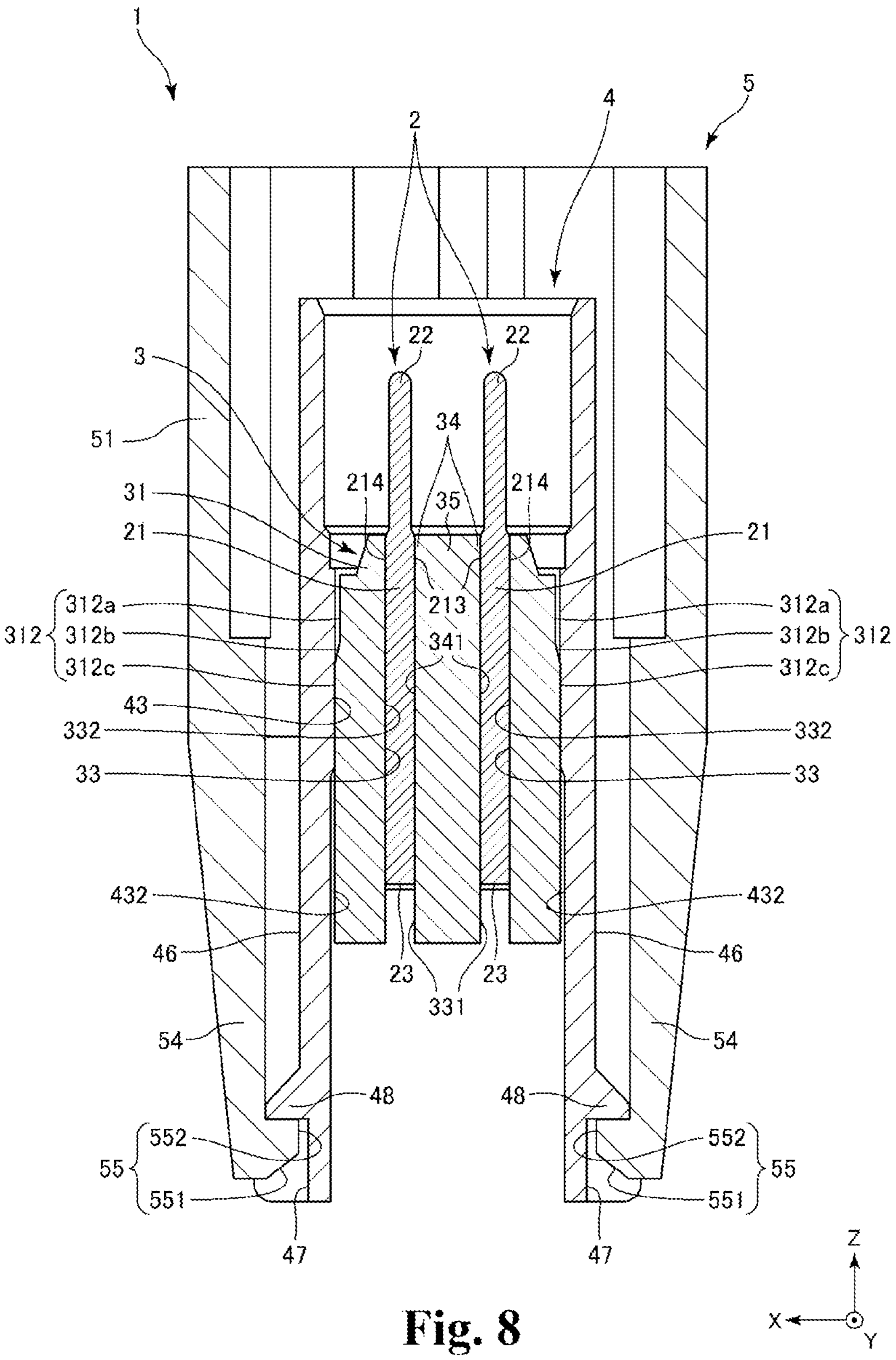
FIG. 8 is an XZ plane cross-sectional view containing the insertion hole of the housing of the electrical connector shown in FIG. 4.
Figure 9:
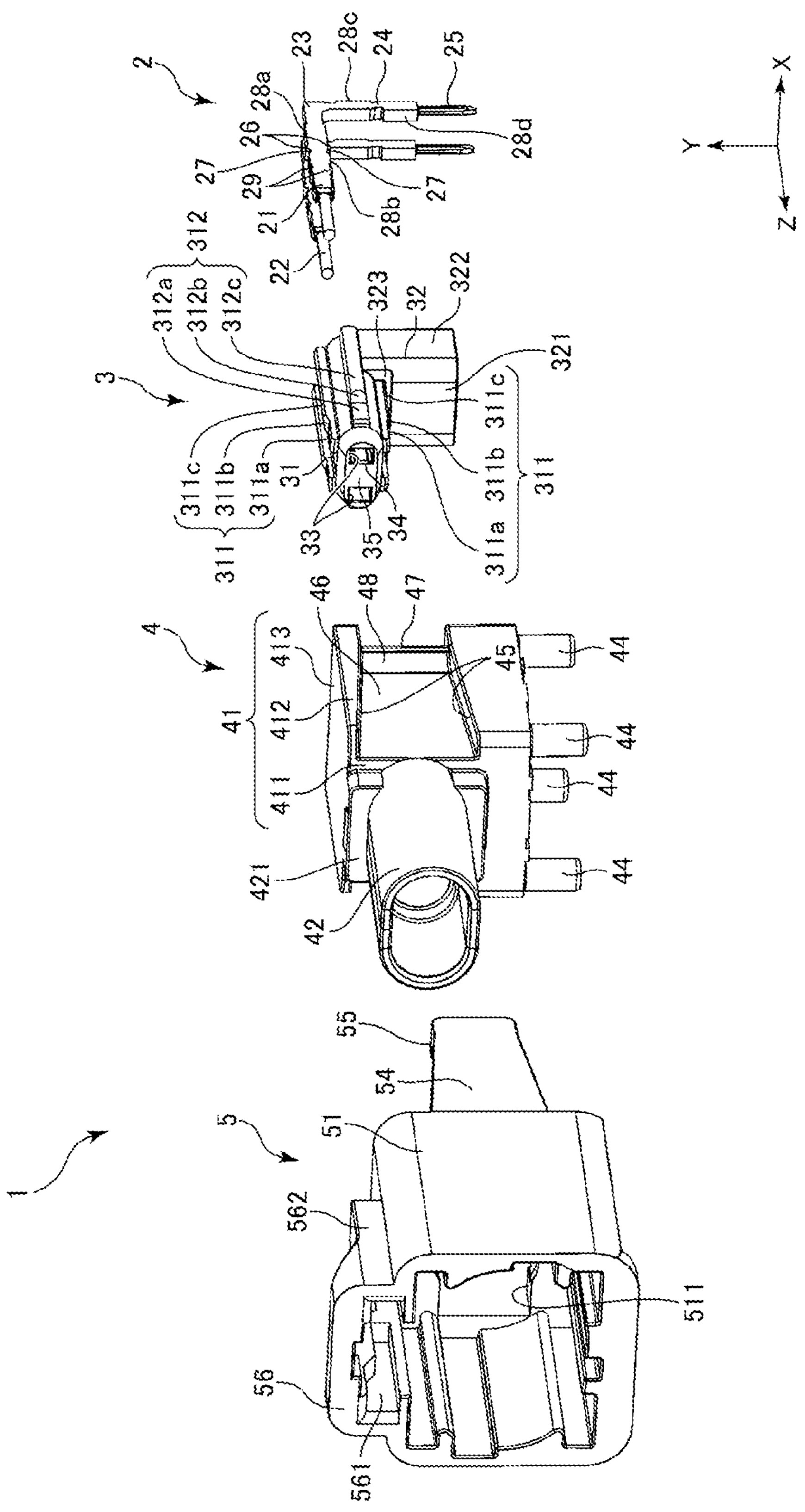
FIG. 9 is an exploded perspective view of the electrical connector shown in FIG. 4.
Figure 10:
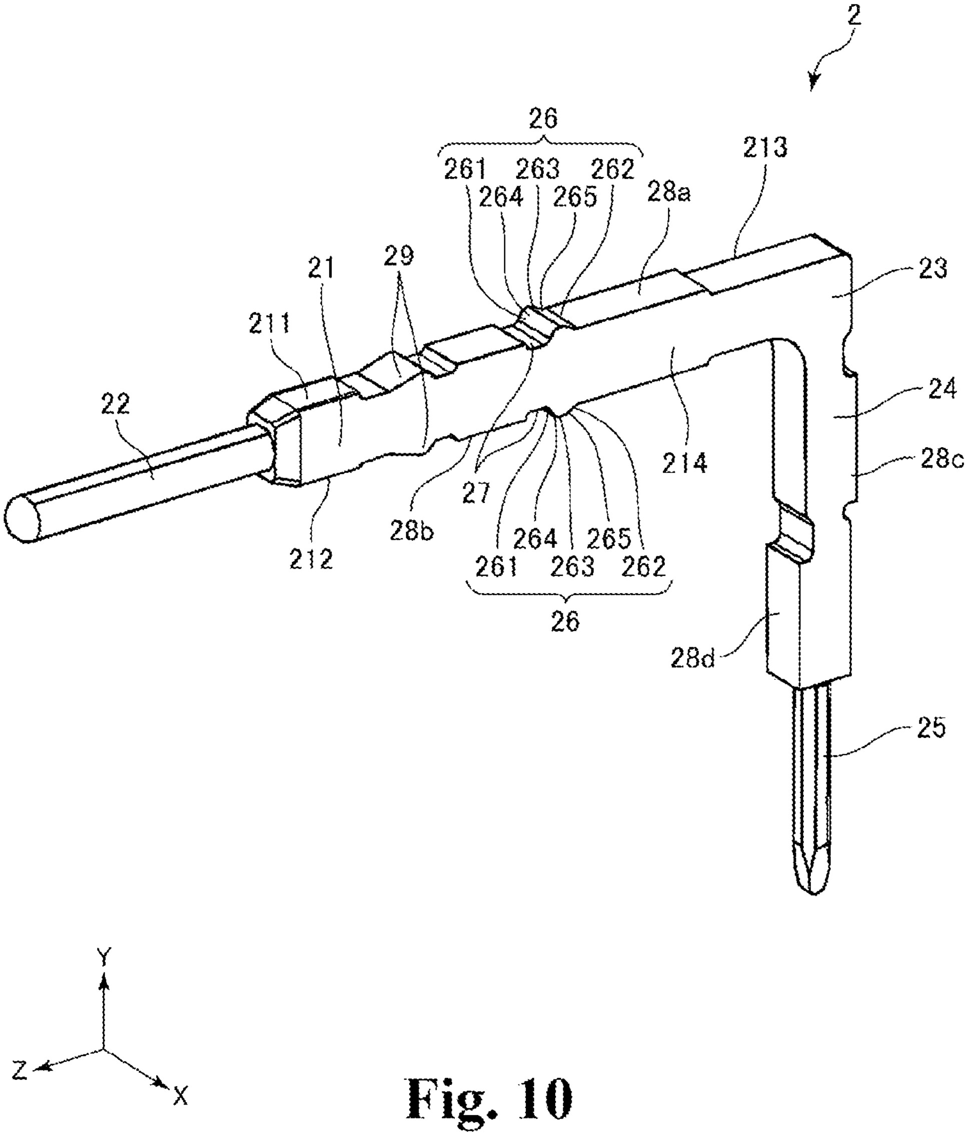
FIG. 10 is a perspective view of a contact pin.
Figure 11:
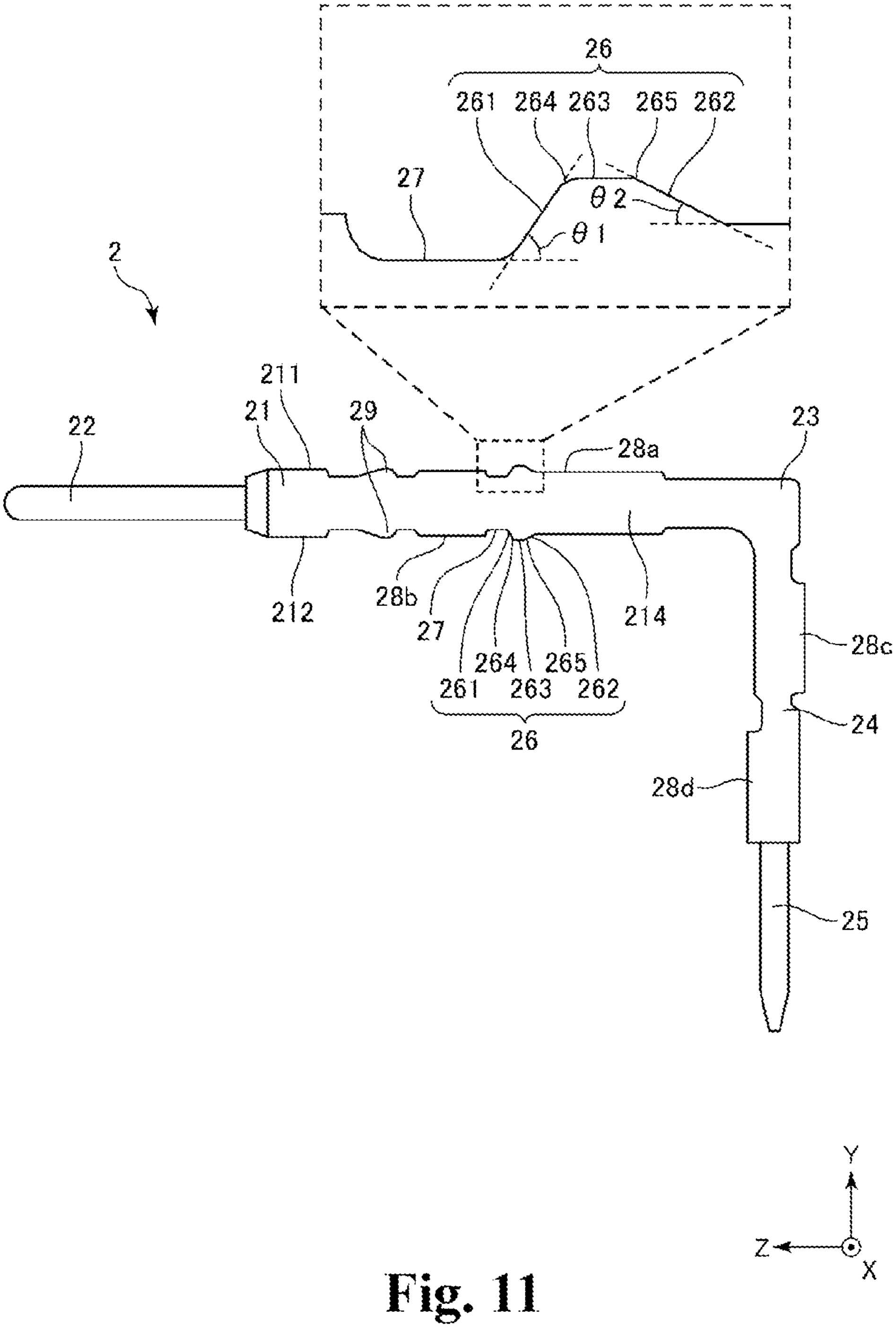
FIG. 11 is a YZ planar view of the contact pin with a partially enlarged view of an upper protruding portion.
Figure 12:
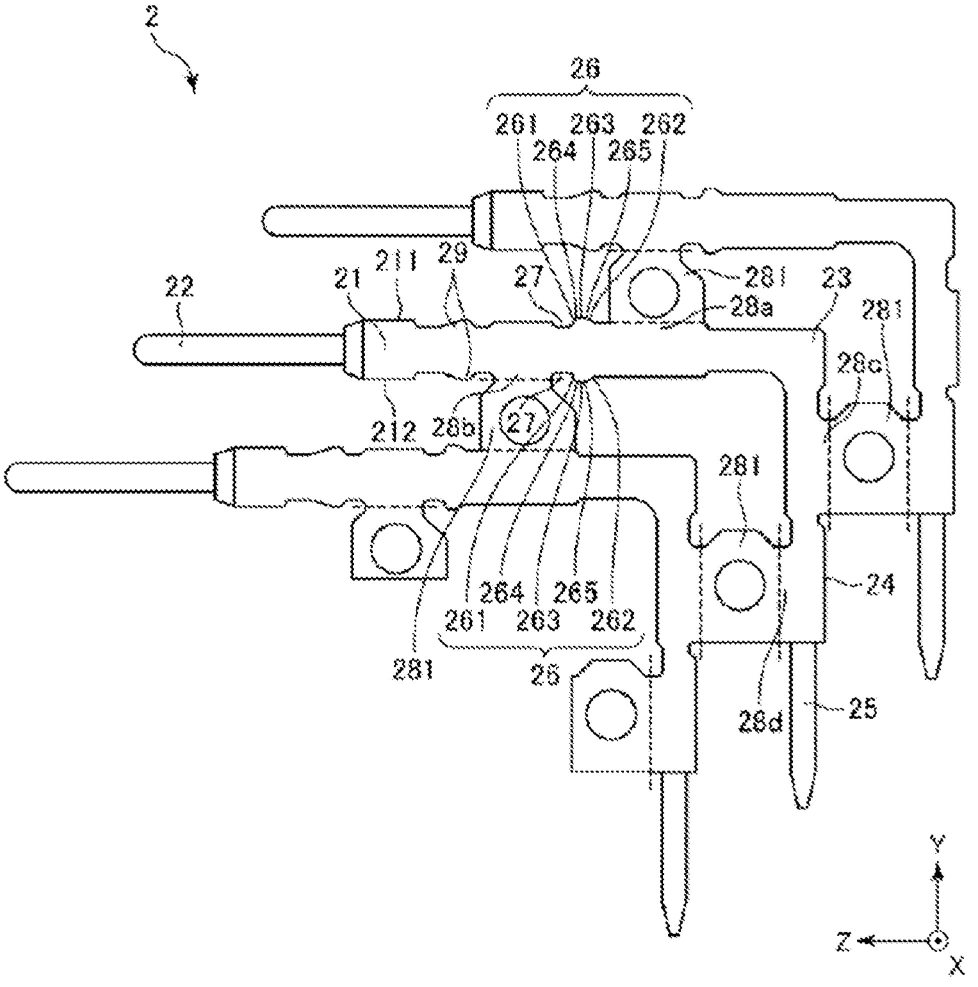
FIG. 12 is a planar view showing a work-in-process of the contact pin.
Figure 13:
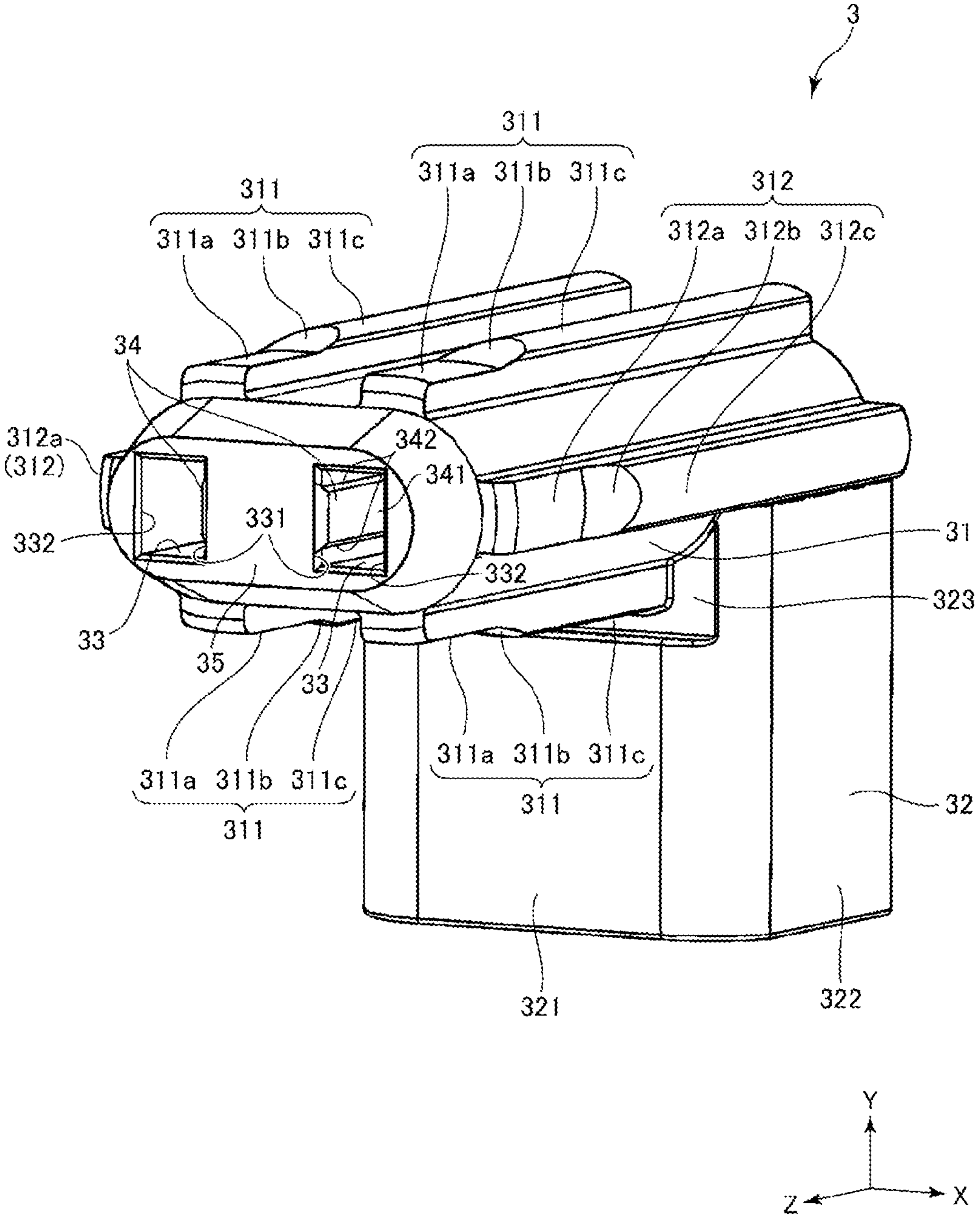
FIG. 13 is a perspective view of the housing.
Figure 14:
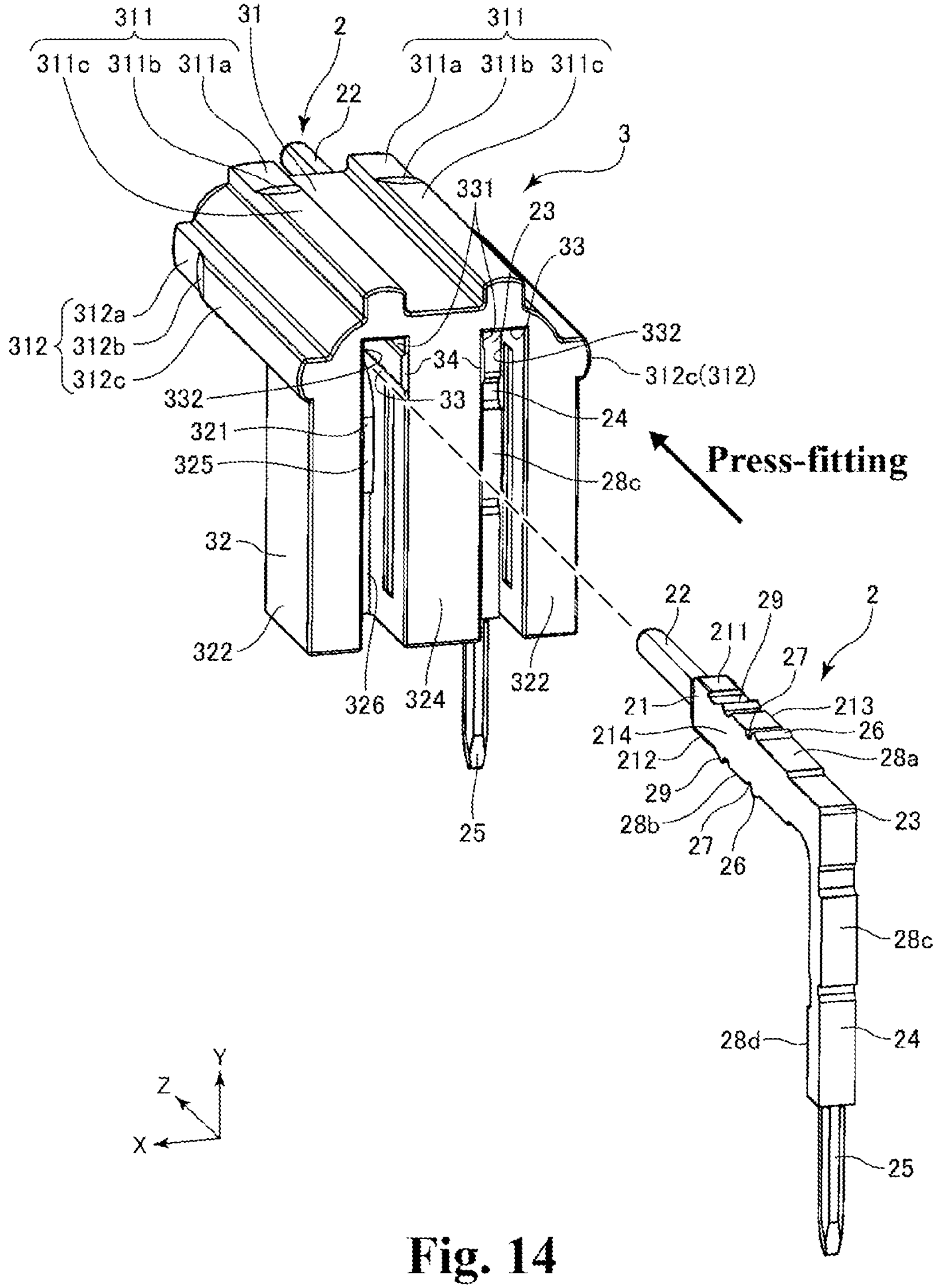
FIG. 14 is a perspective view for explaining a method of press-fitting the contact pin into the housing.
Figure 15A:
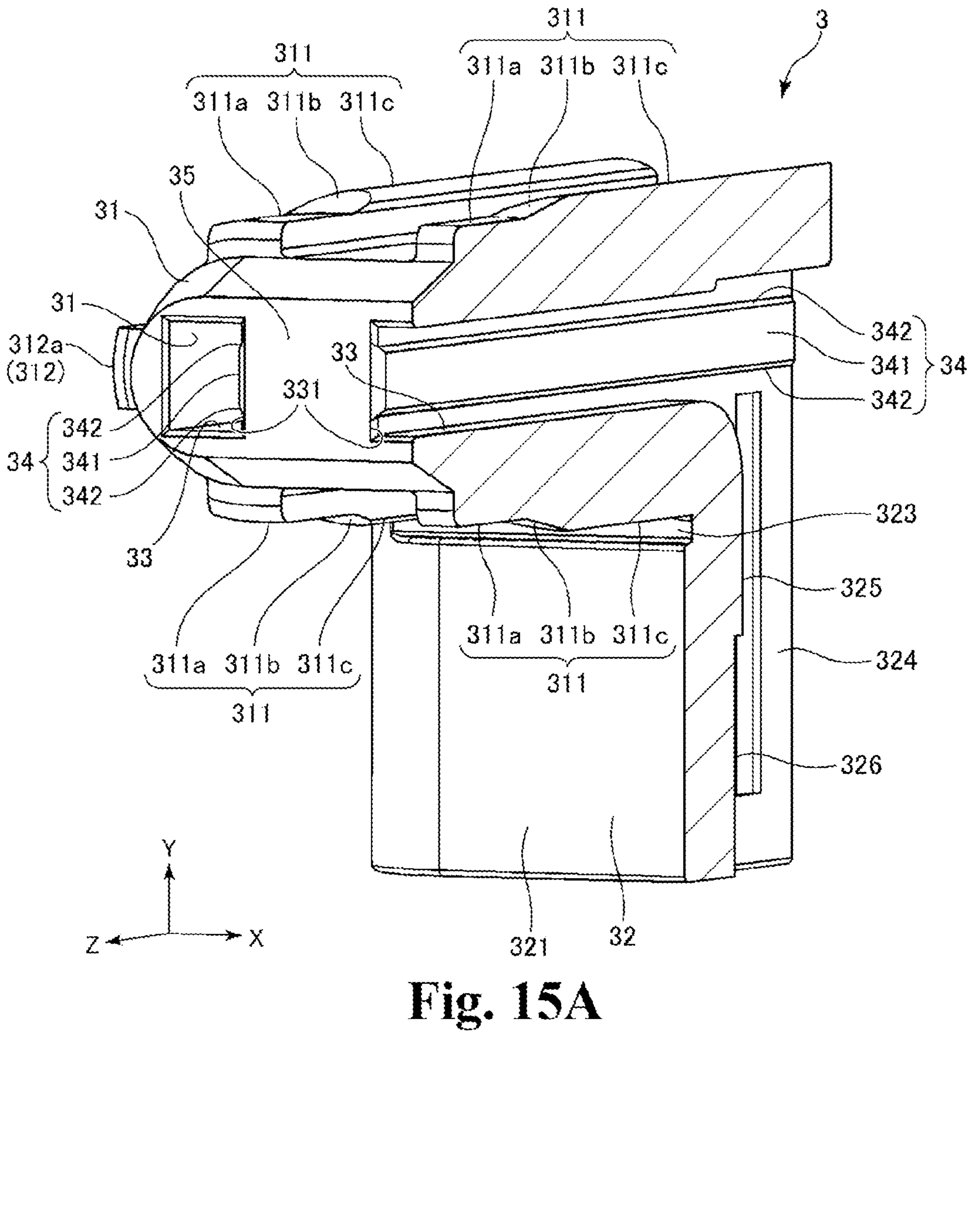
FIG. 15A is a cross-sectional perspective view showing an inside of the insertion hole of the housing.
Figure 15B:
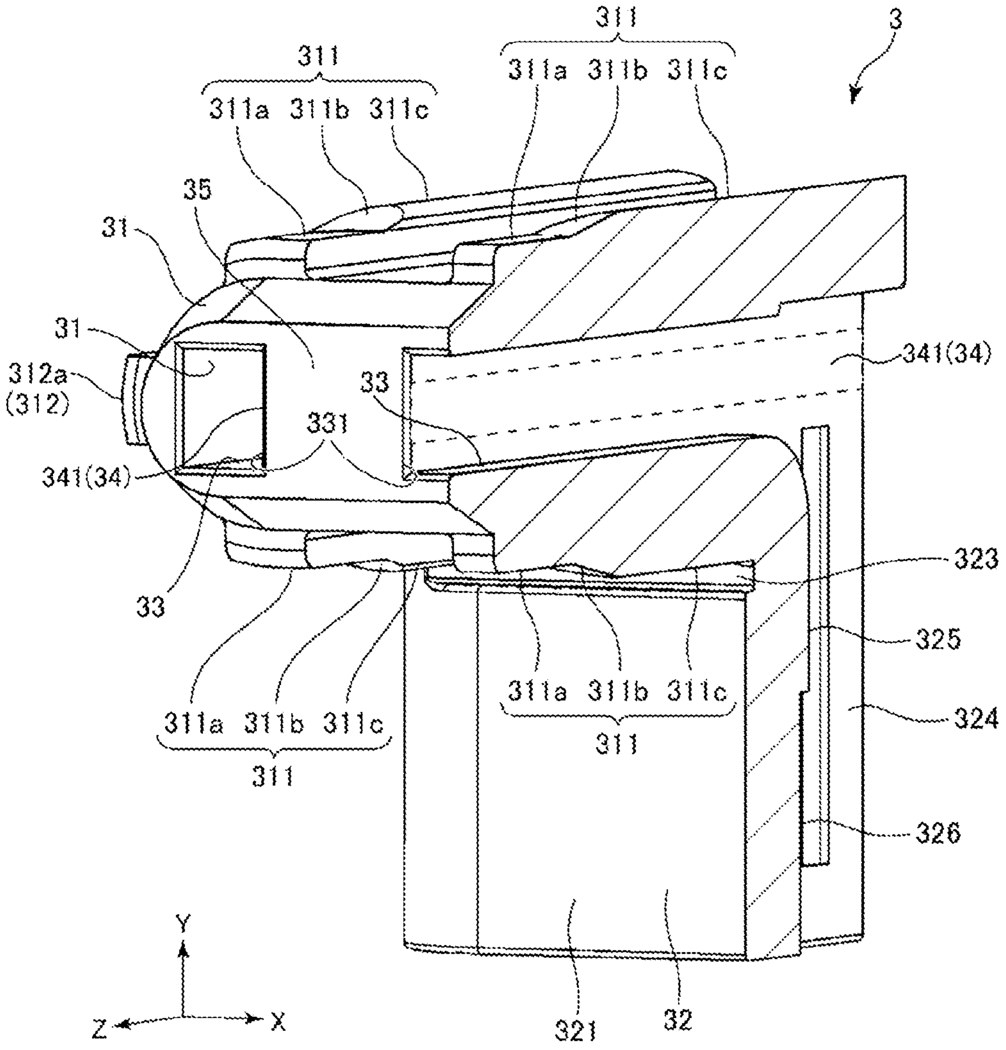
FIG. 15B is a cross-sectional perspective view showing a modified example in which a receiving portion shown in FIG. 15A does not protrude from a first wall of the insertion hole toward the inner side.
Figure 16A:
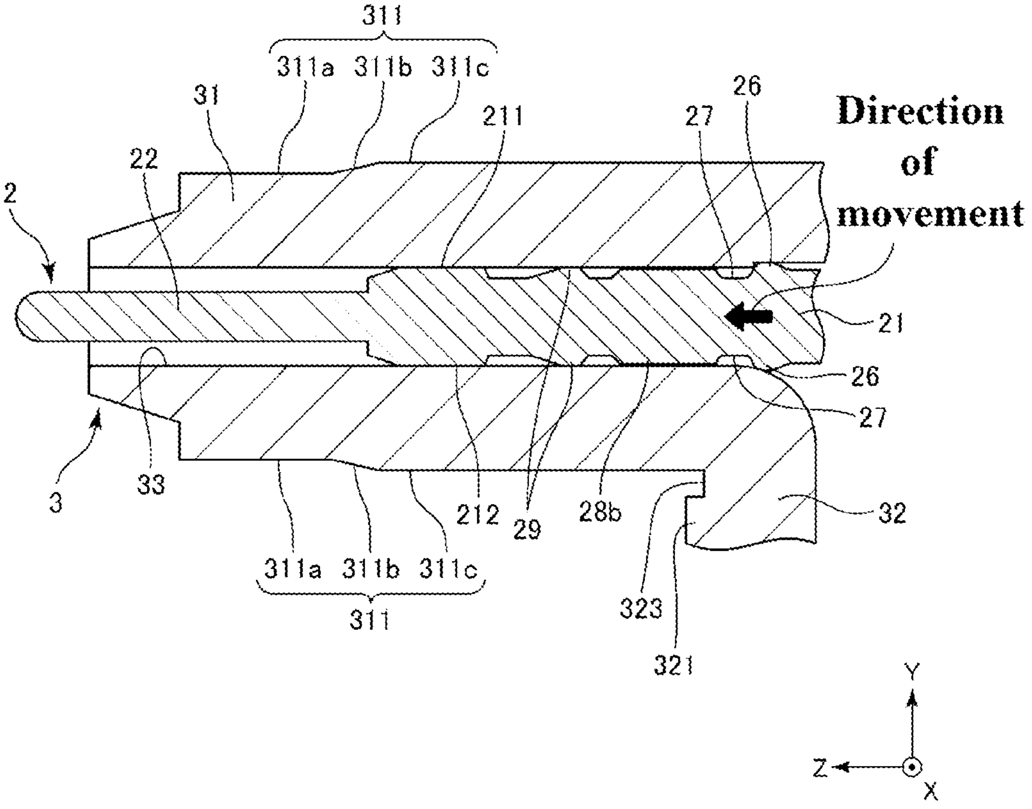
FIG. 16A is a YZ plane cross-sectional view showing a state at a beginning of the press-fitting of the contact pin into the housing.
Figure 16B:
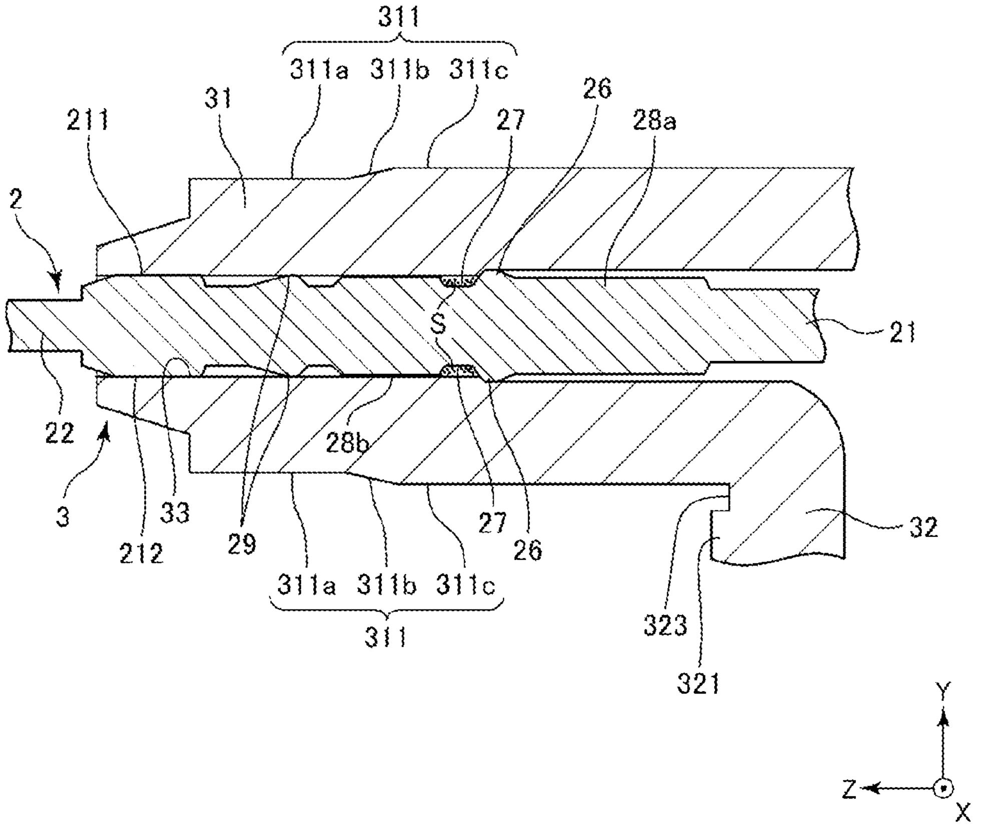
FIG. 16B is a YZ plane cross-sectional view showing a state when the press-fitting of the contact pin into the housing is completed.
Figure 16C:
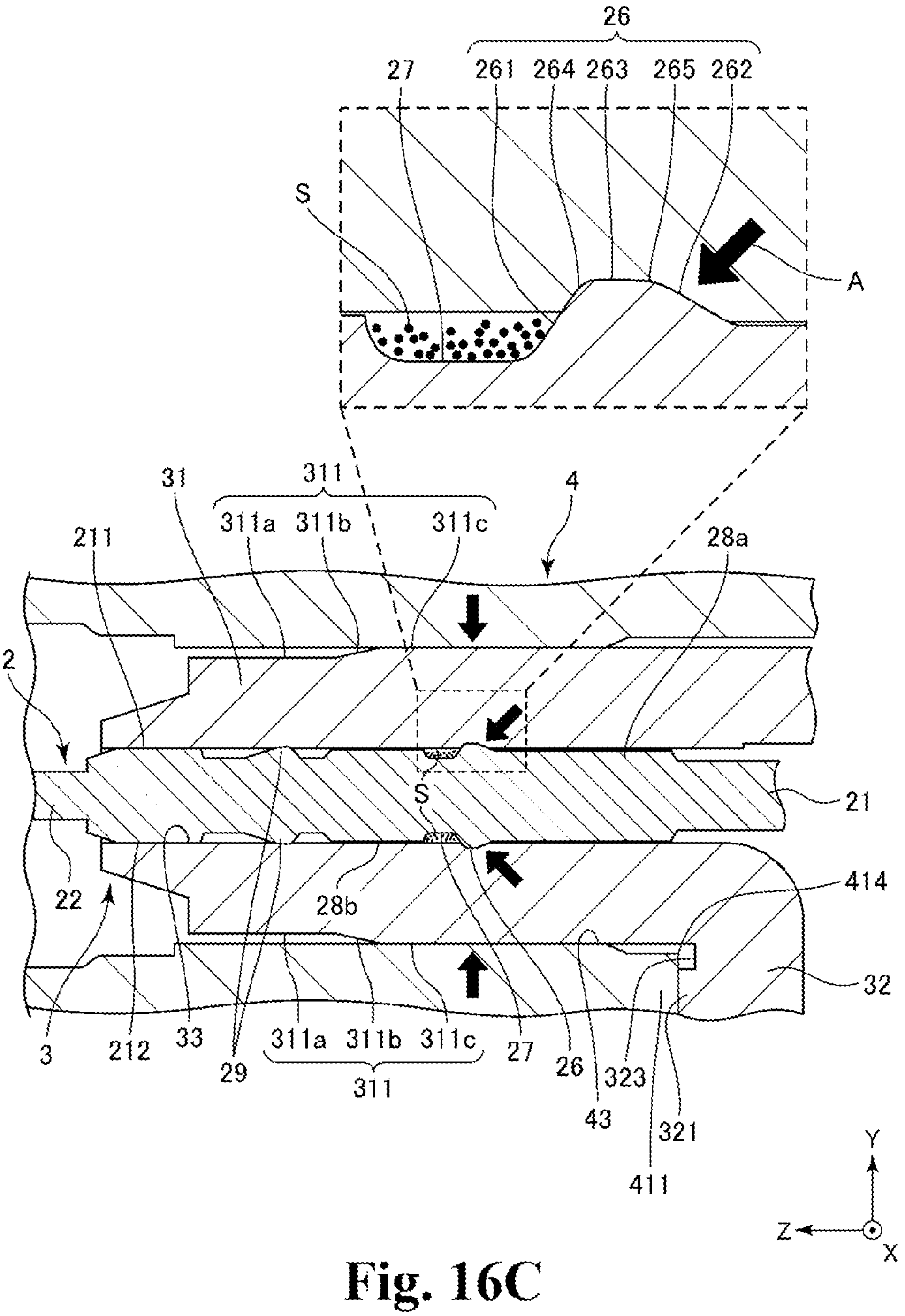
FIG. 16C is a YZ plane cross-sectional view in a state that the housing is held in a shell with a partially enlarged view of the upper protruding portion of the pair of protruding portions of the contact pin.
Figure 17:
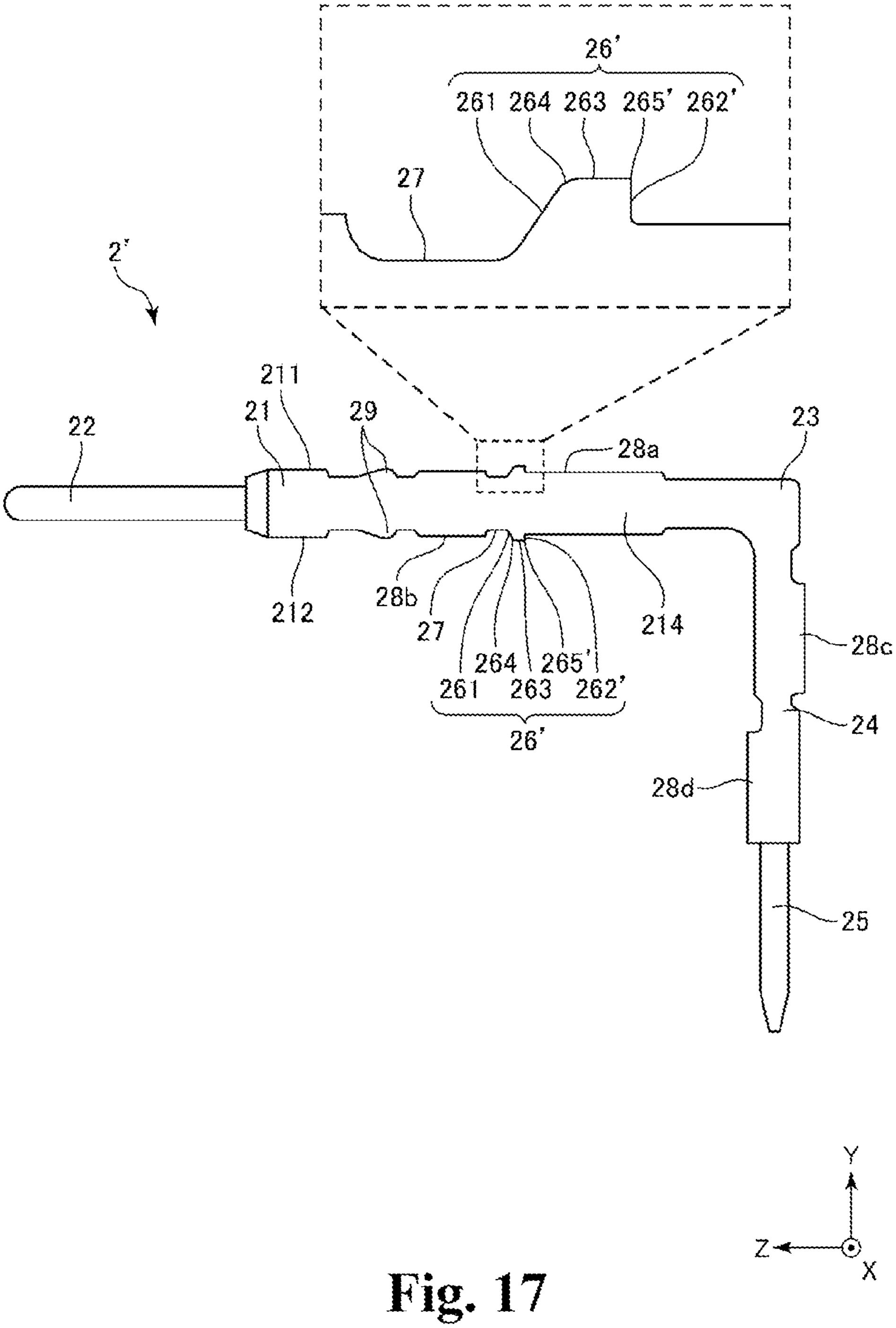
FIG. 17 is a YZ planar view of the contact pin having a pair of protruding portions of a reference shape with a partially enlarged view of an upper protruding portion of the reference shape.
Figure 18A:
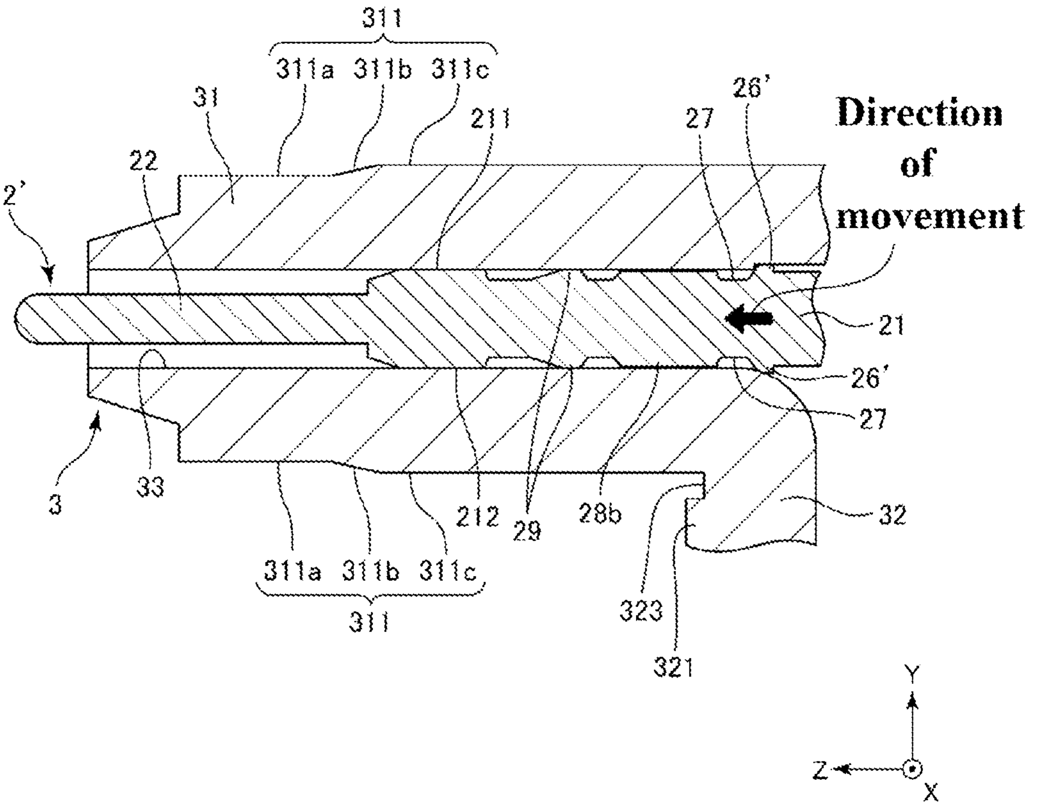
FIG. 18A is a YZ plane cross-sectional view showing a state at a beginning of the press-fitting of the contact pin shown in FIG. 17 into the housing.
Figure 18B:
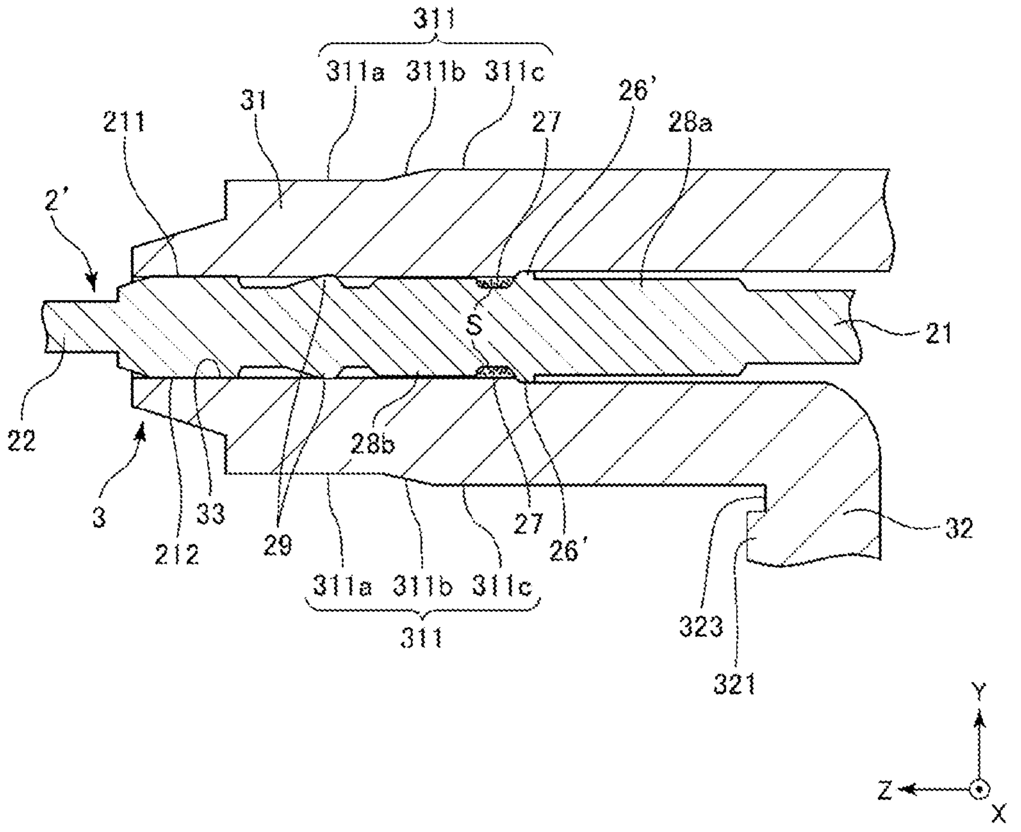
FIG. 18B is a YZ plane cross-sectional view showing a state when the press-fitting of the contact pin shown in FIG. 17 into the housing is completed.
Figure 18C:
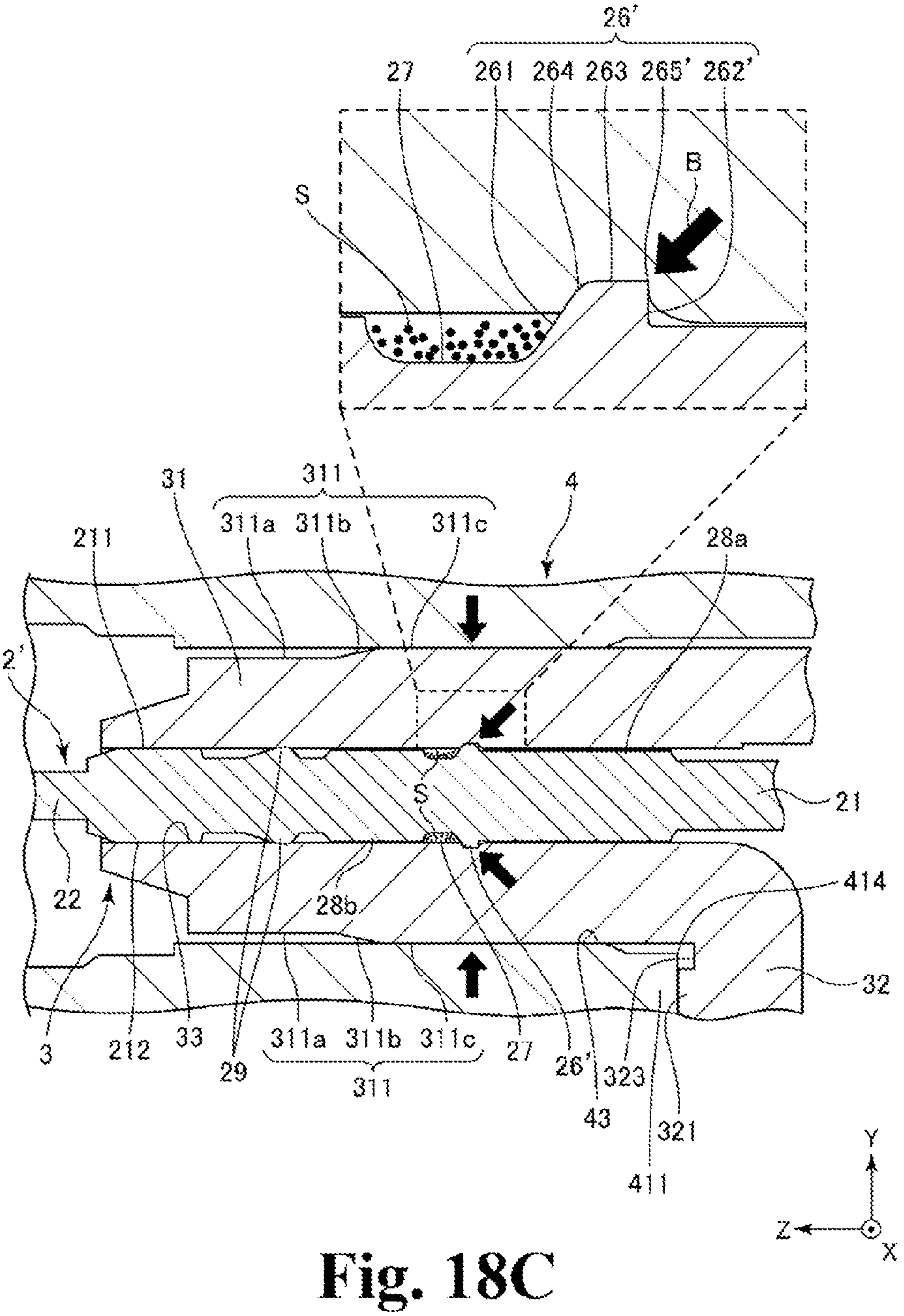
FIG. 18C is a YZ plane cross-sectional view in the state that the housing is held in the shell with a partially enlarged view of the upper protruding portion of the pair of protruding portions of the contact pin shown in FIG. 17.
Figure 19:
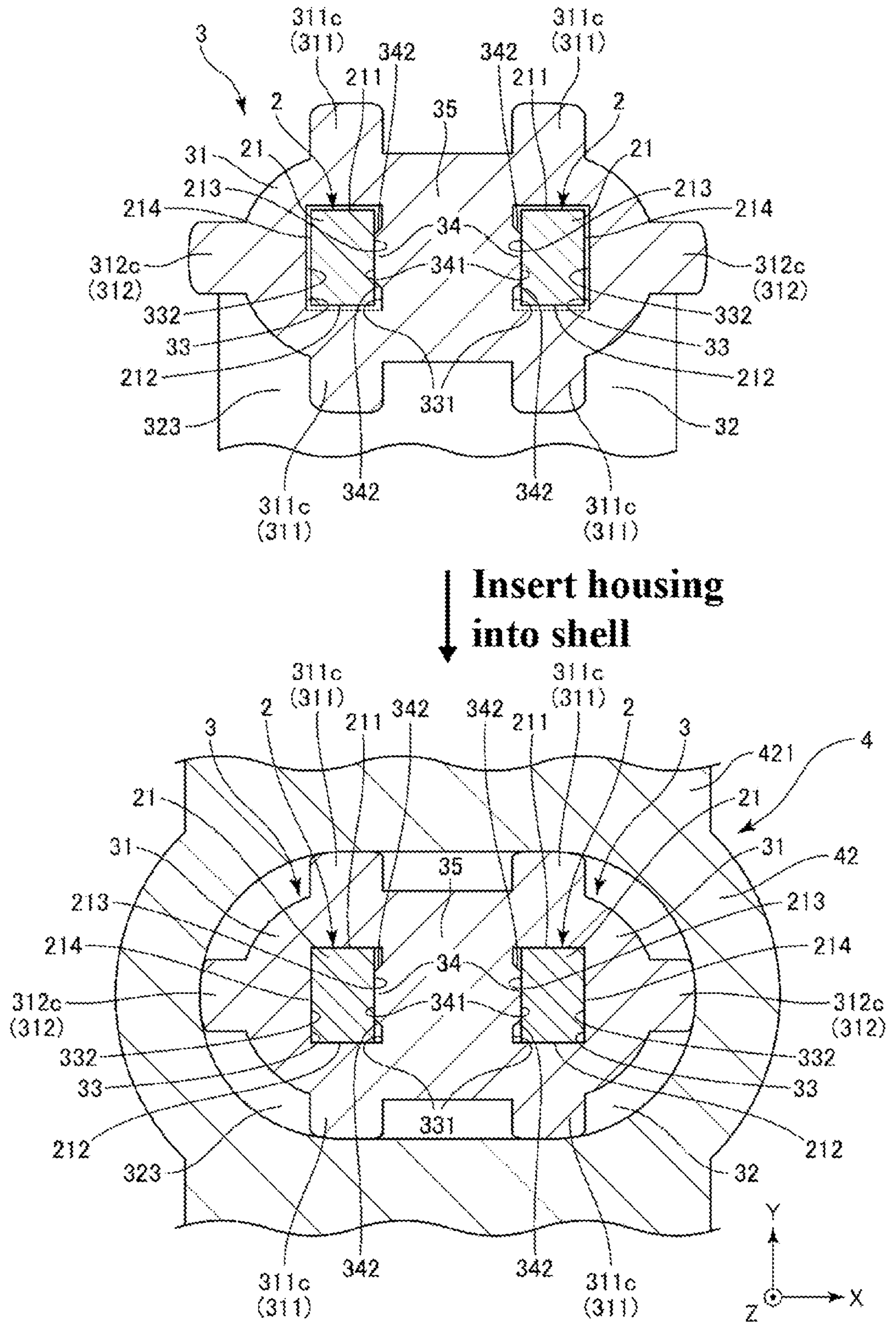
FIG. 19 shows a partially enlarged view of an XY plane cross-sectional view in the state that the press-fitting of the contact pins into the housing is completed and a partially enlarged view of an XY plane cross-sectional view in the state that the housing is held by the shell.
Figure 20:
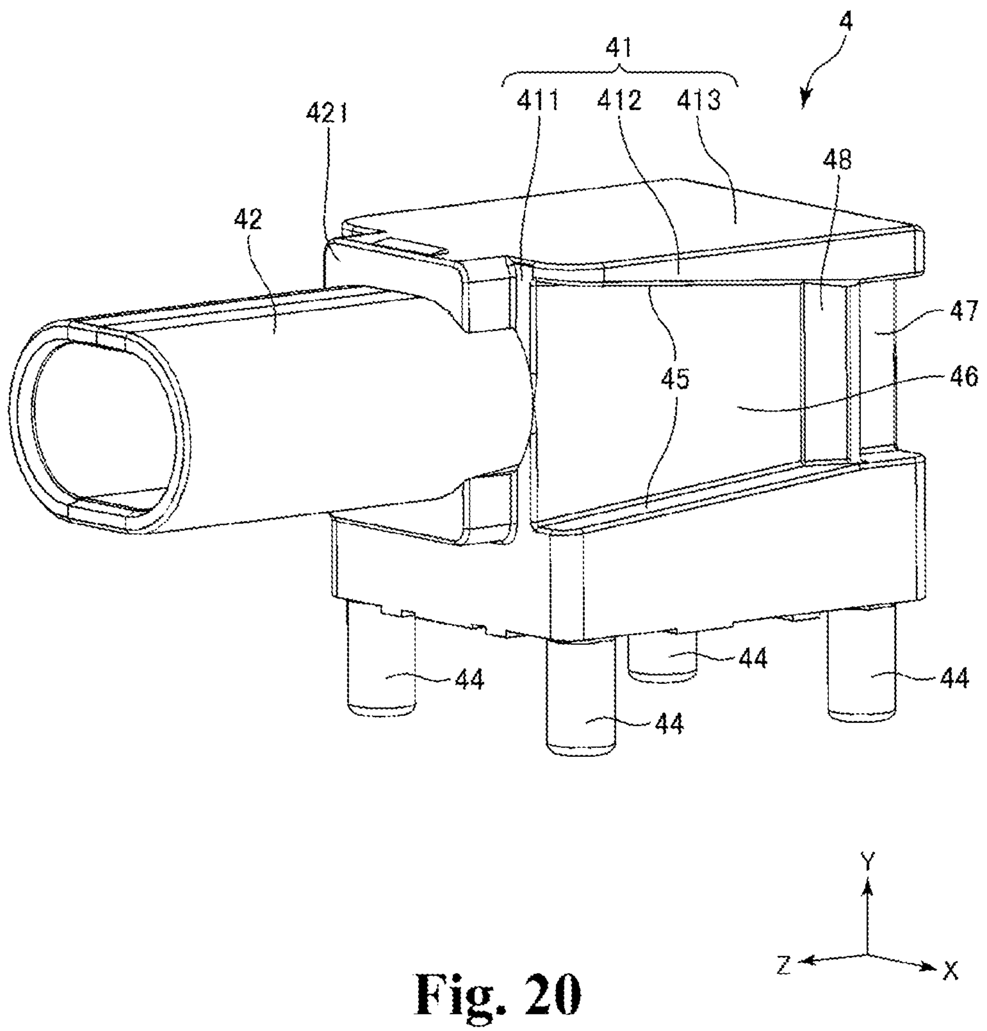
FIG. 20 is a perspective view of the shell.
Figure 21:
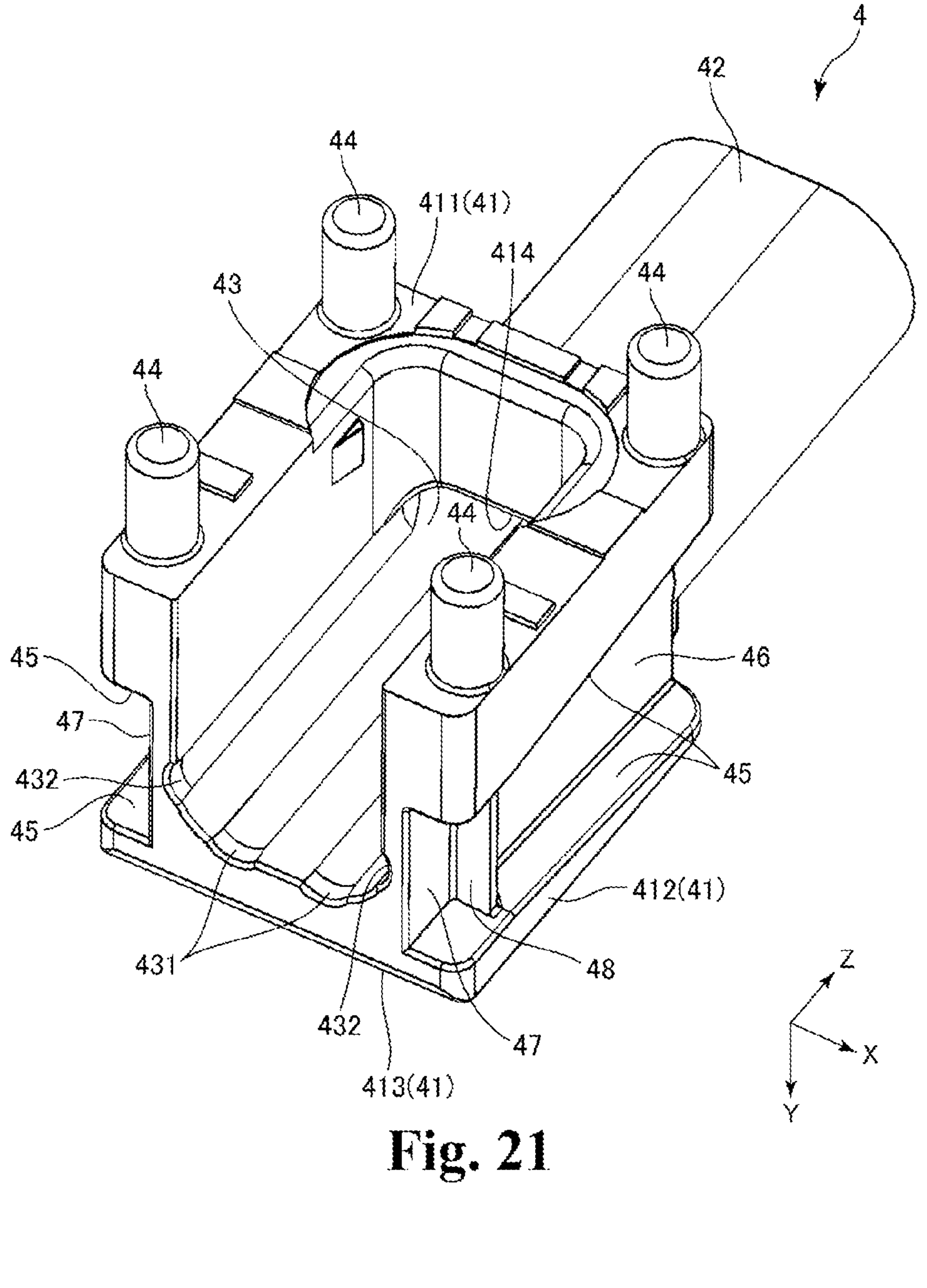
FIG. 21 is a perspective view of the shell viewed from another angle.
Figure 22:
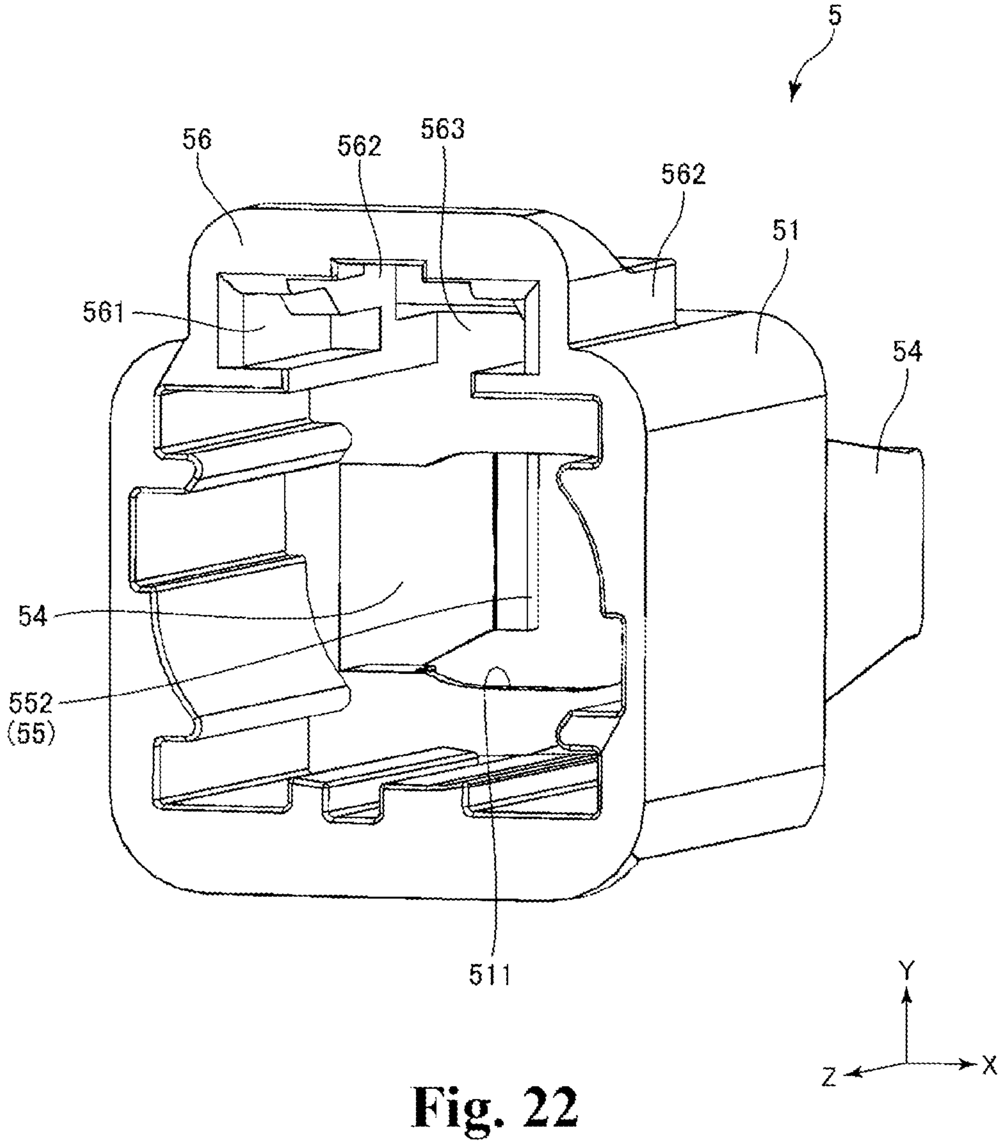
FIG. 22 is a perspective view of a cover.
Figure 23:
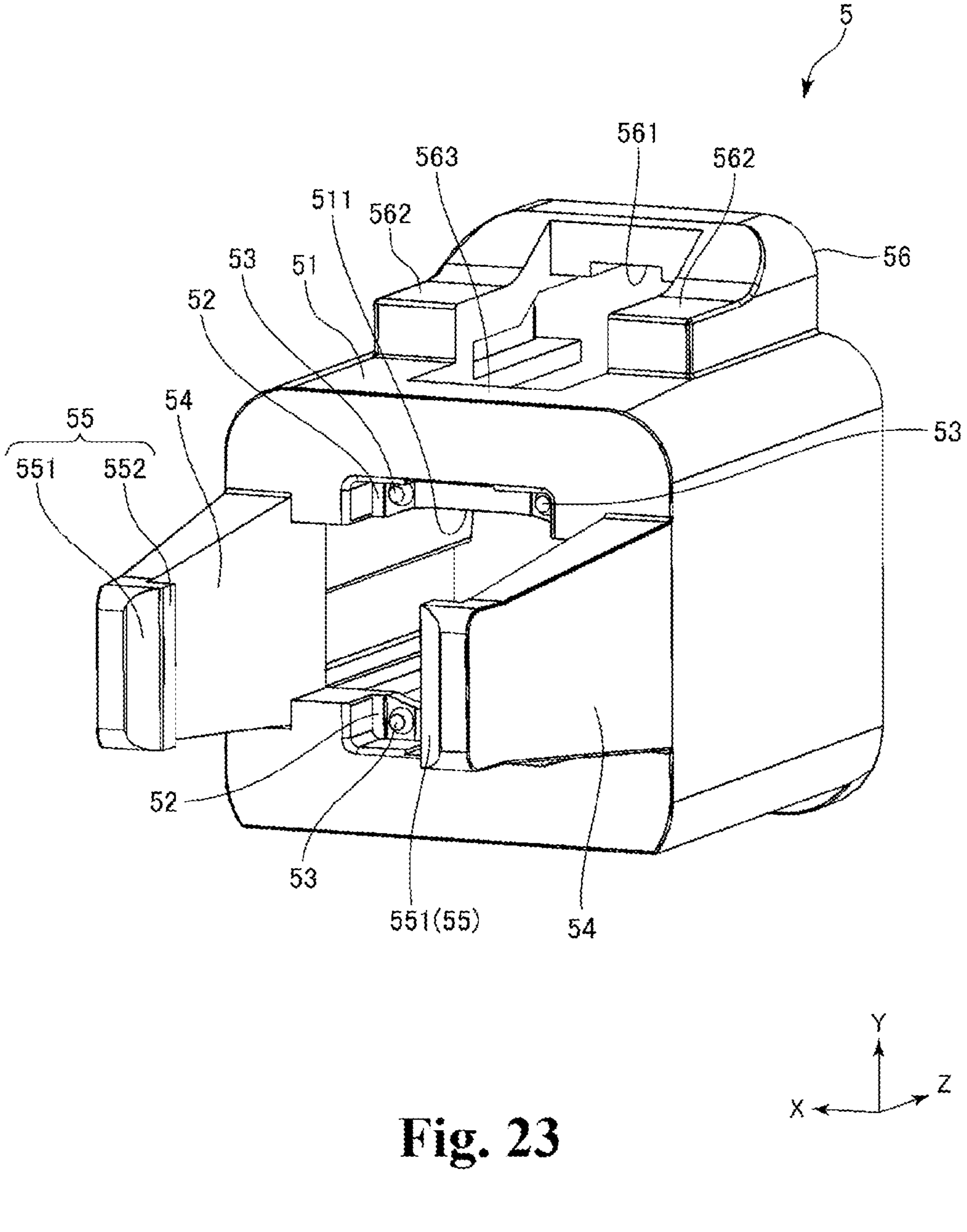
FIG. 23 is a perspective view of the cover viewed from another angle.
Figure 24:
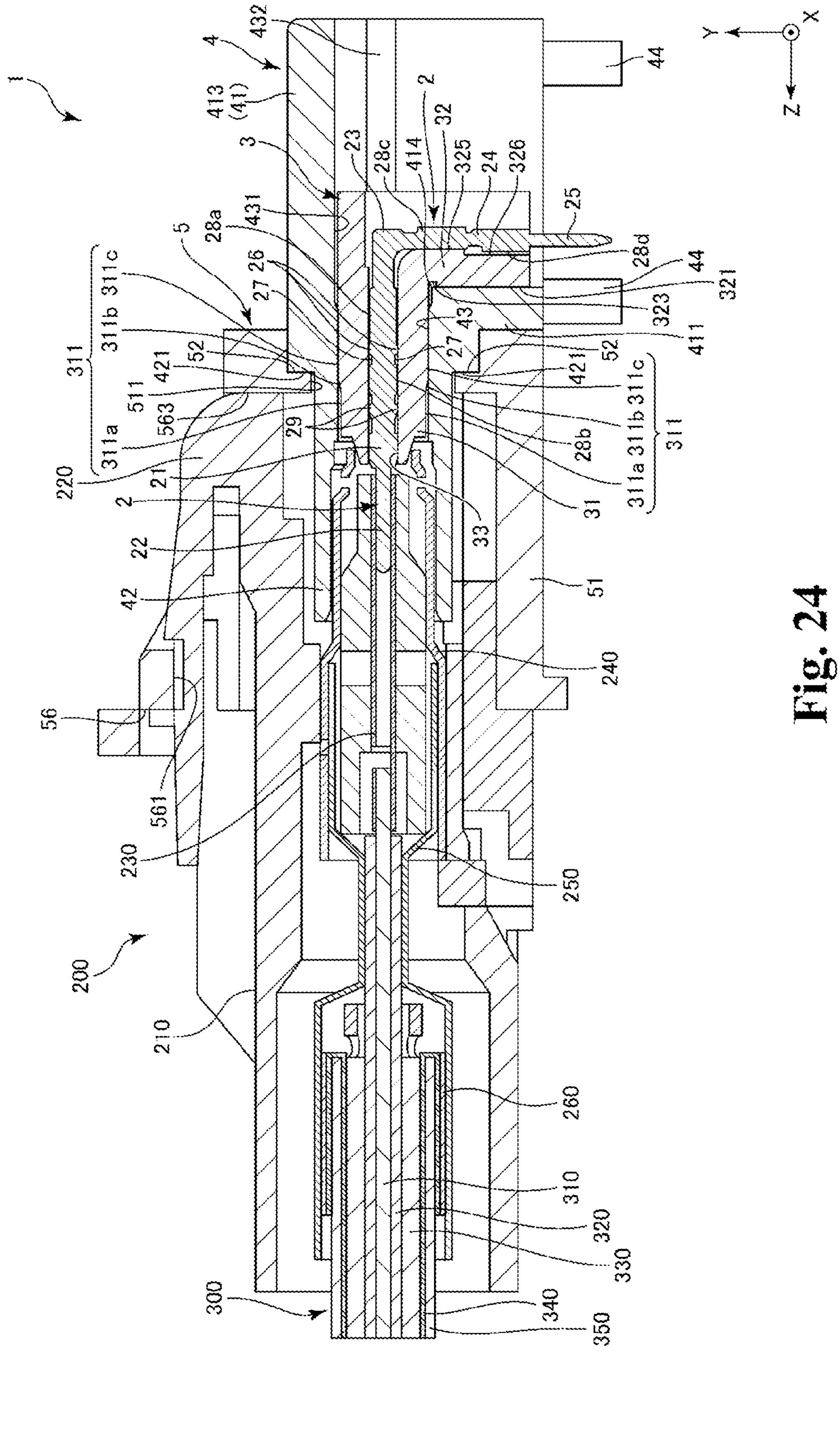
FIG. 24 is a YZ plane cross-sectional view containing the contact pin in a state that the electrical connector and the mating connector are coupled with each other.

FIG. 4 is a perspective view showing an electrical connector of the present disclosure, a circuit board on which the electrical connector of the present disclosure is to be mounted and a mating connector which should be coupled with the electrical connector of the present disclosure. FIG. 5 is a perspective view of the electrical connector shown in FIG. 4. FIG. 6 is another perspective view of the electrical connector shown in FIG. 4 viewed from another angle. FIG. 7 is a YZ plane cross-sectional view containing an insertion hole of a housing of the electrical connector shown in FIG. 4. FIG. 8 is an XZ plane cross-sectional view containing the insertion hole of the housing of the electrical connector shown in FIG. 4. FIG. 9 is an exploded perspective view of the electrical connector shown in FIG. 4. FIG. 10 is a perspective view of a contact pin. FIG. 11 is a YZ planar view of the contact pin with a partially enlarged view of an upper protruding portion. FIG. 12 is a planar view showing a work-in-process of the contact pin. FIG. 13 is a perspective view of the housing. FIG. 14 is a perspective view for explaining a method of press-fitting the contact pin into the housing. FIG. 15A is a cross-sectional perspective view showing an inside of the insertion hole of the housing. FIG. 15B is a cross-sectional perspective view showing a modified example in which a receiving portion shown in FIG. 15A does not protrude from a first wall of the insertion hole toward the inner side. FIG. 16A is a YZ plane cross-sectional view showing a state at a beginning of the press-fitting of the contact pin into the housing. FIG. 16B is a YZ plane cross-sectional view showing a state when the press-fitting of the contact pin into the housing is completed. FIG. 16C is a YZ plane cross-sectional view in a state that the housing is held in a shell with a partially enlarged view of the upper protruding portion of the pair of protruding portions of the contact pin. FIG. 17 is a YZ planar view of the contact pin having a pair of protruding portions of a reference shape with a partially enlarged view of an upper protruding portion of the reference shape. FIG. 18A is a YZ plane cross-sectional view showing a state at a beginning of the press-fitting of the contact pin shown in FIG. 17 into the housing. FIG. 18B is a YZ plane cross-sectional view showing a state when the press-fitting of the contact pin shown in FIG. 17 into the housing is completed. FIG. 18C is a YZ plane cross-sectional view in the state that the housing is held in the shell with a partially enlarged view of the upper protruding portion of the pair of protruding portions of the contact pin shown in FIG. 17. FIG. 19 shows a partially enlarged view of an XY plane cross-sectional view in the state that the press-fitting of the contact pins into the housing is completed and a partially enlarged view of an XY plane cross-sectional view in the state that the housing is held by the shell. FIG. 20 is a perspective view of the shell. FIG. 21 is a perspective view of the shell viewed from another angle. FIG. 22 is a perspective view of a cover. FIG. 23 is a perspective view of the cover viewed from another angle. FIG. 24 is a YZ plane cross-sectional view containing the contact pin in a state that the electrical connector and the mating connector are coupled with each other.

As shown in FIG. 4, an electrical connector 1 of the present disclosure is a receptacle connector which should be mounted on a circuit board 100 provided in an arbitrary device. When a mating connector (a plug connector) 200 attached to a tip end portion of a coaxial cable 300 is inserted into the electrical connector 1 from the tip side to couple the electrical connector 1 with the mating connector 200, the coaxial cable 300 and the circuit board 100 are electrically connected to each other through the electrical connector 1 and the mating connector 200.

The coaxial cable 300 has a coaxial structure in which a pair of core wires (center conductors) 310, a pair of inner insulator layers 320 respectively covering the pair of core wires 310, a first outer insulator layer 330 covering the pair of inner insulator layers 320, an outer conductor layer (a braid layer) 340 covering the first outer insulator layer 330 and a second outer insulator layer 350 further covering the outer conductor layer 340 are concentrically arranged. Although this matter is omitted in FIG. 4, other end portion of the coaxial cable 300 is connected to another device differing from the device including the circuit board 100. Thus, when the electrical connector 1 and the mating connector 200 are coupled with each other, it becomes possible to perform a signal communication between the device including the circuit board 100 and the other device through the coaxial cable 300. The device including the circuit board 100 is typically an ECU (Electronic Control Unit) for controlling operations of a vehicle. The other device to which the other end portion of the coaxial cable 300 is connected is typically an in-vehicle device such as an in-vehicle network communication equipment (for example, which is used for an in-vehicle Ethernet), a car navigation system, a car audio, an in-vehicle camera, an in-vehicle GPS, an in-vehicle TV and an in-vehicle radio. By coupling the electrical connector 1 and the mating connector 200 with each other, it becomes possible to perform a high-speed signal communication between the in-vehicle device and the ECU through the coaxial cable 300 containing the two core wires (center conductors) 310. Although the electrical connector 1 is a 2-pin connector for providing a coaxial connection with the coaxial cable 300 containing the two core wires 310 in the illustrated embodiment, the electrical connector 1 may be a multi-pin connector such as a 4-pin connector (for example, a high-speed data (HSD) connector) for providing coaxial connections with two or more pairs of coaxial cables 300 containing two or more pairs of core wires 310. Hereinafter, the electrical connector 1 will be described with assuming that the electrical connector 1 is the 2-pin connector for providing the coaxial connection with the coaxial cable 300 containing the two core wires 310.

As shown in FIGS. 5-9, in particular FIG. 9, the electrical connector 1 includes two contact pins 2 which should be respectively contacted with corresponding contact pins 230 (see FIG. 24) of the mating connector 200, a housing 3 for holding the two contact pins 2, a metallic shell 4 for holding the housing 3 and a cover 5 attached to a tip side portion of the shell 4.

Each of the two contact pins 2 is an L-shaped member made of a conductive material such as a copper alloy. The contact pin 2 contacts with the corresponding contact pin 230 of the mating connector 200 to provide an electrical connection between the mating connector 200 and the electrical connector 1 when the electrical connector 1 and the mating connector 200 are coupled with each other. The two contact pins 2 are respectively press-fitted into a pair of insertion holes 33 (see FIG. 9) formed in a cylindrical portion 31 of the housing 3. FIGS. 10 and 11 show the contact pin 2 located on the +X direction side of the two contact pins 2 shown in FIG. 9. Since the two contact pins 2 have the same configuration, the contact pin 2 located on the +X direction side will be described in detail as a representative.

As shown in FIG. 10, the contact pin 2 includes a horizontally extending portion 21 linearly extending in the insertion and extraction direction of the mating connector 200 (the Z direction), a contact portion 22 linearly extending from a tip end portion of the horizontally extending portion 21 toward the tip side, a connection portion 23 bent from a base end portion of the horizontally extending portion 21 so as to extend toward the lower side, a downwardly extending portion 24 linearly extending from a lower end portion of the connection portion 23 toward the lower side, a terminal portion 25 protruding from a lower end portion of the downwardly extending portion 24 toward the lower side, a pair of first protruding portions 26 respectively extending in a height direction (the Y direction and the outer side) of the contact pin 2 perpendicular to the insertion and extraction direction of the mating connector 200 (the Z direction) from an upper surface and a lower surface (surfaces perpendicular to the Y direction) of the horizontally extending portion 21, a pair of concave portions 27 respectively formed on the upper surface and the lower surface of the horizontally extending portion 21 at portions adjacent to the portions of the horizontally extending portion 21 where the pair of first protruding portions 26 are formed, a first cut mark **28*a* protruding in the height direction (the +Y direction) of the contact pin 2 from the upper surface of the horizontally extending portion 21, a second cut mark 28*b* protruding in the height direction (the −Y direction) of the contact pin 2 from the lower surface of the horizontally extending portion 21, a third cut mark 28*c* protruding from the downwardly extending portion 24 toward the base side, a fourth cut mark 28*d* protruding from the downwardly extending portion 24 toward the tip side and a pair of second protruding portions 29 respectively extending in the height direction (the Y direction and the outer side) of the contact pin 2 perpendicular to the insertion and extraction direction of the mating connector 200 (the Z direction) from the upper surface and the lower surface of the horizontally extending portion 21**.

The horizontally extending portion 21 is a plate-like portion linearly extending in the insertion and extraction direction of the mating connector 200 (the Z direction). When the pair of contact pins 2 are respectively press-fitted into the pair of insertion holes 33 of the housing 3, the horizontally extending portions 21 are located in the cylindrical portion 31 of the housing 3. As shown in FIG. 7, the horizontally extending portion 21 is held in the insertion hole 33, and thereby the contact pin 2 is held by the housing 3.

Referring back to FIG. 10, more specifically, the horizontally extending portion 21 has a first surface (the upper surface) 211 and a second surface (the lower surface) 212 which are perpendicular to the Y direction and spaced apart from each other and extend substantially parallel to each other in the insertion and extraction direction of the mating connector 200, and a third surface (an inner surface) 213 and a fourth surface (an outer surface) 214 which are perpendicular to the first surface 211 and the second surface 212 and spaced apart from each other and extend substantially parallel to each other in the insertion and extraction direction of the mating connector 200.

The contact portion 22 is a columnar portion linearly extending from the tip end portion of the horizontally extending portion 21 toward the tip side. Further, the contact portion 22 protrudes from the cylindrical portion 31 of the housing 3 toward the tip side so as to be exposed to the outside in a state that the contact pin 2 is held by the housing 3 as shown in FIG. 5. When the electrical connector 1 and the mating connector 200 are coupled with each other, the contact portion 22 contacts with the corresponding contact pin 230 of the mating connector 200 to provide the electrical connection between the mating connector 200 and the electrical connector 1.

Referring back to FIG. 10, the connection portion 23 is an L-shaped portion for connecting the horizontally extending portion 21 and the downwardly extending portion 24. The connection portion 23 is bent from the base end portion of the horizontally extending portion 21 toward the lower side. One end portion of the connection portion 23 (an end portion facing the +Z direction) is continuous with the base end portion of the horizontally extending portion 21. The other end portion of the connection portion 23 (an end portion facing the −Y direction) is continuous with an upper end portion of the downwardly extending portion 24. The downwardly extending portion 24 is a plate-like portion linearly extending from the lower end portion of the connection portion 23 toward the lower side. As shown in FIG. 7, the downwardly extending portion 24 is located in a downwardly extending portion 32 of the housing 3 in the state that the contact pin 2 is held by the housing 3. Referring back to FIG. 10, the terminal portion 25 is a conical portion formed so as to protrude from the lower end portion of the downwardly extending portion 24 toward the lower side. The terminal portion 25 extends toward the lower side so as to be exposed to the outside in the state that the contact pin 2 is held by the housing 3. The terminal portion 25 should be connected to a corresponding terminal 120 (see FIG. 4) of the circuit board 100.

The pair of first protruding portions 26 respectively extend in the height direction (the Y direction and the outer side) from the first surface 211 and the second surface 212 of the horizontally extending portion 21. The cylindrical portion 31 of the housing 3 is inserted into an after-mentioned insertion hole 43 (see FIG. 21) of the shell 4 and the housing 3 is held by the shell 4. In this state, each of the first protruding portions 26 can enhance locking force of the contact pin 2 in the insertion hole 33 because an inner surface of the insertion hole 33 is pressed against each of the first protruding portions 26. Although a width (a length in the X direction) of each of the first protruding portions 26 is the same as a width of the horizontally extending portion 21 in the illustrated embodiment, the present disclosure is not limited thereto. The scope of the disclosure also involves an aspect in which the width of each of the first protruding portions 26 is different from the width of the horizontally extending portion 21 and steps exist between both side surfaces of the horizontally extending portion 21 and both side surfaces of each of the first protruding portions 26. The width of the horizontally extending portion 21 and the width of each of the first protruding portions 26 may be appropriately set to different values depending on the shape, state, and the like of the housing 3 into which the contact pin 2 is press-fitted. Further, although the pair of first protruding portions 26 are respectively formed on the first surface 211 and the second surface 212 in the illustrated embodiment, the number and positions of the first protruding portions 26 formed on the first surface 211 and the second surface 212 are not limited thereto. One, three, or more first protruding portions 26 may be formed on the first surface 211 and/or the second surface 212.

Each of the first protruding portions 26 has a tapered shape whose length in the Z direction gradually decreases toward the outside (the Y direction side). Since the pair of first protruding portions 26 (an upper protruding portion 26 formed on the first surface 211 and a lower protruding portion 26 formed on the second surface 212) have the same configuration, the configuration of the upper first protruding portion 26 will be described in the following description as a representative. FIG. 11 contains a partially enlarged view in which a vicinity of the upper first protruding portion 26 is enlarged.

The upper first protruding portion 26 includes a front slope portion 261 obliquely extending with respect to the first surface 211, a rear slope portion 262 located closer to the base side than the front slope portion 261 and obliquely extending with respect to the first surface 211, a flat portion 263 linearly extending between the front slope portion 261 and the rear slope portion 262 in the insertion and extraction direction of the mating connector 200, a front connection portion 264 connecting a base end portion of the front slope portion 261 and a tip end portion of the flat portion 263 and a rear connection portion 265 connecting a tip end portion of the rear slope portion 262 and a base end portion of the flat portion 263.

The front slope portion 261 extends in the insertion and extraction direction of the mating connector 200 (the Z direction) and in a direction away from the horizontally extending portion 21 from the first surface 211 of the horizontally extending portion 21. The front slope portion 261 is a slope whose height (a length in the Y direction) gradually increases from the tip side to the base side. The front slope portion 261 extends in an oblique direction (an upper right direction in FIG. 11) from the first surface 211. The tip end portion of the front slope portion 261 is continuous with the concave portion 27 formed on the first surface 211. The base end portion of the front slope portion 261 is connected with the tip end portion of the flat portion 263 through the front connection portion 264. Further, an outer surface of the front connection portion 264 connecting the base end portion of the front slope portion 261 and the flat portion 263 is chamfered to become a curved surface.

The rear slope portion 262 extends in the insertion and extraction direction of the mating connector 200 (the Z direction) and in a direction approaching to the horizontally extending portion 21 and connecting with the first surface 211 of the horizontally extending portion 21. The rear slope portion 262 is located closer to the base side than the front slope portion 261. Further, the rear slope portion 262 is a slope whose height (the length in the Y direction) gradually decreases from the tip side to the base side. The rear slope portion 262 extends in an oblique direction (a lower right direction in FIG. 11). The tip end portion of the rear slope portion 262 is connected with the base end portion of the flat surface 263 through the rear connection portion 265. The base end portion of the rear slope portion 262 is connected with the first surface 211. Further, an outer surface of the rear connection portion 265 connecting the tip end portion of the rear slope portion 262 and the base end portion of the flat portion 263 is chamfered to become a curved surface.

The flat portion 263 has a constant height (the length in the Y direction) along the insertion and extraction direction of the mating connector 200 (the Z direction). The flat portion 263 is a portion whose outer surface is a flat surface perpendicular to the Y direction. The flat portion 263 is located between the front slope portion 261 and the rear slope portion 262 and linearly extends in the insertion and extraction direction of the mating connector 200.

Referring back to FIGS. 10 and 11, the pair of concave portions 27 are respectively formed on the first surface 211 and the second surface 212 of the horizontally extending portion 21 at positions adjacent to the pair of first protruding portions 26. The pair of concave portions 27 are respectively located on the tip side of the pair of first protruding portions 26 (specifically, located on the tip side of the front slope portions 261). When the contact pin 2 is press-fitted into the insertion hole 33 of the housing 3 as described above, the pair of concave portions 27 have a function of collecting after-mentioned shavings S (see FIG. 16B) generated by the flat portion 263 of the contact pin 2 shaving the inner surface of the insertion hole 33.

Since the pair of concave portions 27 (an upper concave portion 27 and a lower concave portion 27) have the same configuration, the upper concave portion 27 formed on the first surface 211 of the horizontally extending portion 21 will be described in detail as a representative. The upper concave portion 27 is formed on the first surface 211 of the horizontally extending portion 21 at a portion adjacent to the upper first protruding portion 26. A depth (the length of the Y direction) and a length of the Z direction of the concave portion 27 are appropriately set so that the concave portion 27 has a dimension sufficient to collect the shavings S generated when the contact pin 2 is press-fitted into the insertion hole 33. Further, the depth (the length of the Y direction) and the length of the Z direction of the concave portion 27 are appropriately set so as not to impair mechanical strength required for the contact pin 2. Further, a connection portion between a tip end surface (a surface located in the +Z direction) and a bottom surface of the concave portion 27 is a chamfered curved portion. Similarly, a connection portion between a base end surface (a surface located in the −Z direction) and the bottom surface of the concave portion 27 is a chamfered curved portion. Further, the base end surface of the concave portion 27 is continuous with the front slope portion 261.

As shown in FIG. 11, a first angle (a first inclination) θ1 which is an angle of the front slope portion 261 with respect to the bottom surface (the first surface 211 of the horizontally extending portion 21) of the concave portion 27 is greater than a second angle (a second inclination) θ2 which is an angle of the rear slope portion 262 with respect to the first surface 211 in a planar view viewed from the X direction. In one example, the first angle θ1 may be in a range of 40° to 70°, and the second angle θ2 may be in a range of 15° to 39°. Although the first angle θ1 and the second angle θ2 are preferably set to be large in order to suppress a decrease in impedance of the contact pin 2 at the portions where the pair of first protruding portions 26 are formed, press-fitting force required to press-fit the contact pin 2 into the insertion hole 33 of the housing 3 increases if the first angle θ1 is set too large. By setting the first angle θ1 within the above-described range, it is possible to prevent a significant decrease in transmission characteristics of the contact pin 2 and to reduce the press-fitting force required when the contact pin 2 is press-fitted into the insertion hole 33 of the housing 3.

As shown in FIG. 11, the first cut mark 28*a* is a portion that protrudes upwardly (the +Y direction) from the first surface 211 of the horizontally extending portion 21 and is located at a position closer to the base side than the upper first protruding portion 26. The second cut mark 28*b* is a portion that protrudes downwardly (the −Y direction) from the second surface 212 of the horizontally extending portion 21 and is located at a position closer to the tip side than the lower first protruding portion 26. The third cut mark 28*c* protrudes from a base end surface of the downwardly extending portion 24 toward the base side. The fourth cut mark 28*d* protrudes from a tip end surface of the downwardly extending portion 24 toward the tip side.

The pair of second protruding portions 29 respectively extend from the first surface 211 and the second surface 212 of the horizontally extending portion 21 toward the outside (the Y direction). Since the pair of second protruding portions 29 (an upper second protruding portion 29 and a lower second protruding portion 29) have the same configuration, the upper second protruding portion 29 in FIG. 11 will be described in detail as a representative.

The upper second protruding portion 29 is located closer to the tip side than a portion where the second cut mark 28*b* is formed. The upper second protruding portion 29 has a tapered shape whose length in the Z direction gradually decreases toward the outside (the Y direction side). The upper second protruding portion 29 has a function of increasing the locking force of the contact pin 2 in the insertion hole 33 by contacting with the inner surface of the insertion hole 33 in the state that the cylindrical portion 31 of the housing 3 is inserted into the insertion hole 43 of the shell 4 and the housing 3 is held by the shell 4. Locking force provided by the pair of second protruding portions 29 contacting with the inner surface of the insertion hole 33 is also applied in addition to the above-mentioned locking force provided by the pair of first protruding portions 26 against which the inner surface of the insertion hole 33 holding the contact pin 2 is pressed inwardly. Thus, it is possible to more reliably prevent the contact pin 2 from being shifted toward the base side in the housing 3 and removed from the insertion hole 33.

The contact pin 2 described above is obtained by performing a cutting process on a work-in-process shown in FIG. 12. Hereinafter, a manufacturing process of the contact pin 2 will be described with reference to FIG. 12. First, a sheet of metal plate is punched into a predetermined shape to obtain a work-in-process shown in FIG. 12. In the work-in-process stage, a plurality of contact pins 2 are connected to each other through a plurality of carriers 281. In the illustrated embodiment, the plurality of contact pins 2 include first to third contact pins 2 which are arranged from the lower side to the upper side in this order in FIG. 12. Specifically, the first surface 211 of the horizontally extending portion 21 of the second contact pin 2 is connected with the second surface 212 of the horizontally extending portion 21 of the third contact pin 2 through the carrier 281. Further, the second surface of the horizontally extending portion 21 of the second contact pin 2 is connected with the first surface 212 of the horizontally extending portion 21 of the first contact pin 2 through the carrier 281. Furthermore, the base end surface of the downwardly extending portion 24 of the second contact pin 2 is connected with the tip end surface of the downwardly extending portion 24 of the third contact pin 2 through the carrier 281. Moreover, the tip end surface of the downwardly extending portion 24 of the second contact pin 2 is connected with the base end surface of the downwardly extending portion 24 of the first contact pin 2. In this state, three contact pins 2 are obtained by cutting portions illustrated by the dotted lines in FIG. 12 to cut out the three contact pins 2 from the carriers 281. After the cutting process is completed, a remaining portion of the carrier 281 remaining at the first surface 211 of the second contact pin 2 is the first cut mark 28*a*. A remaining portion of the carrier 281 remaining at the second surface 212 of the second contact pin 2 is the second cut mark 28*b*. A remaining portion of the carrier 281 remaining at the base end surface of the downwardly extending portion 24 of the second contact pin 2 is the third cut mark 28*c*. A remaining portion of the carrier 281 remaining at the tip end surface of the downwardly extending portion 24 of the second contact pin 2 is the fourth cut mark 28*d*. Thus, the obtained second contact pin 2 corresponds to the contact pin 2 shown in FIGS. 10 and 11.

The above-mentioned contact pin 2 is press-fitted into the insertion hole 33 of the housing 3 and held by the housing 3. The housing 3 is made of an insulating material having elasticity such as a resin material (for example, Liquid Crystal Polymer (LCP)). The housing 3 includes the cylindrical portion 31 extending in the insertion and extraction direction of the mating connector 200 and the downwardly extending portion 32 extending from a base end portion of the cylindrical portion 31 toward the lower side as shown in FIGS. 13 and 14.

The cylindrical portion 31 is a cylindrical portion linearly extending in the insertion and extraction direction of the mating connector 200 (the Z direction) as shown in FIG. 13. The cylindrical portion 31 has a rectangular planar shape with rounded corners in a planar view viewed from the Z direction. A length in the width direction (the X direction) of the cylindrical portion 31 is longer than a length in the height direction (the Y direction) thereof in the planar view viewed from the Z direction. An upper surface and a lower surface of the cylindrical portion 31 are flat surfaces being spaced apart from each other and extending in the insertion and extraction direction of the mating connector 200. Both side surfaces of the cylindrical portion 31 located in the X direction are curved surfaces being spaced apart from each other and extending in the insertion and extraction direction of the mating connector 200. Outer diameter of the cylindrical portion 31 is slightly smaller than an inner diameter of the insertion hole 43 of the body portion 41 of the shell 4.

The cylindrical portion 31 includes four first pressing ribs 311 respectively located on the upper surface and the lower surface of the cylindrical portion 31 so as to extend in the insertion and extraction direction of the mating connector 200, a pair of second pressing ribs 312 respectively located on both side surfaces of the cylindrical portion 31 located in the X direction so as to extend in the insertion and extraction direction of the mating connector 200, the pair of insertion holes 33 passing through the cylindrical portion 31 in the insertion and extraction direction of the mating connector 200, a flat receiving portion 34 formed on the inner surface of each of the insertion holes 33 and a wall portion 35 partitioning the pair of insertion holes 33.

The four first pressing ribs 311 are protruding portions protruding from an outer peripheral surface of the cylindrical portion 31 toward the outside. The four first pressing ribs 311 prevent each contact pin 2 from being shifted in the insertion hole 33 of the housing 3 toward the base side and removed from the insertion hole 33 of the housing 3. Further, the four first pressing ribs 311 prevent the housing 3 from being removed from the insertion hole 43 of the shell 4. The four first pressing ribs 311 are respectively formed on the upper surface and the lower surface of the cylindrical portion 31 at positions respectively corresponding to positions of the pair of first protruding portions 26 of the contact pins 2. The four first pressing ribs 311 are protruding portions which lineally extend in the insertion and extraction direction of the mating connector 200 (the Z direction). Two of the four first pressing ribs 311 are located on the upper surface of the cylindrical portion 31, and the remaining two of the four first pressing ribs 311 are located on the lower surface of the cylindrical portion 31. The two upper first pressing ribs 311 respectively face the two lower first pressing ribs 311 through the pair of insertion holes 33 of the cylindrical portion 31. The two upper first pressing ribs 311 are spaced apart from each other on the upper surface of the cylindrical portion 31. The two lower first pressing ribs 311 are spaced apart from each other on the lower surface of the cylindrical portion 31.

In the illustrated embodiment, although the two first pressing ribs 311 located on the upper surface of the cylindrical portion 31 and the two first pressing ribs 311 located on the lower surface of the cylindrical portion 31 are symmetrically formed in the vertical direction, the present disclosure is not limited thereto. For example, one, two, three, five or more first pressing ribs 311 may be formed on the outer peripheral surface of the cylindrical portion 31.

Each of the four first pressing ribs 311 includes a low-height portion 311*a* located on a tip end portion of the cylindrical portion 31, an inclined portion 311*b* extending from the low-height portion 311*a* toward the outside and a high-height portion 311*c* extending from the inclined portion 311*b* toward the base side.

The low-height portion 311*a* is a protruding portion located on the tip end portion of the cylindrical portion 31 and extending at a constant height from the tip end portion toward the base side. A height (the length in the Y direction) of the low-height portion 311*a* is set so that the low-height portion 311*a* does not contact with an inner peripheral surface of the insertion hole 43 of the shell 4 in the state that the housing 3 is held in the shell 4. The inclined portion 311*b* is located between the low-height portion 311*a* and the high-height portion 311*c*. A height of the inclined portion 311*b* gradually increases from the tip side toward the base side. Further, a tip end portion of the inclined portion 311*b* is continuous with a base end portion of the low-height portion 311*a*, and a base end portion of the inclined portion 311*b* is continuous with a tip end portion of the high-height portion 311*c*. When the cylindrical portion 31 of the housing 3 is inserted into the insertion hole 43 of the shell 4, the inner peripheral surface of the insertion hole 43 of the shell 4 slides on an outer surface (a surface perpendicular to the Y direction) of each of the inclined portions 311*b*, and thereby insertion of the cylindrical portion 31 of the housing 3 into the insertion hole 43 is guided.

The high-height portion 311*c* is a portion which is located closer to the base side than the inclined portion 311*b*. The high-height portion 311*c* protrudes toward the outside so as to extend at a constant height from the base end portion of the inclined portion 311*b* toward the base side. In the state that the housing 3 is held by the shell 4, each high-height portion 311*c* contacts with the inner peripheral surface of the insertion hole 43 of the shell 4 to prevent the cylindrical portion 31 of the housing 3 from being removed from the insertion hole 43. Further, each high-height portion 311*c* contacts with the inner peripheral surface of the insertion hole 43 and is pressed by the inner peripheral surface of the insertion hole 43 toward the inner side. When the high-height portion 311*c* is pressed toward the inner side, a portion of the cylindrical portion 31 where the high-height portion 311*c* is formed is elastically deformed toward the inner side. As a result, since the inner surface of the insertion hole 33 contacts with the contact pin 2, it is possible to prevent the contact pin 2 from being shifted in the insertion hole 33 and removed from the insertion hole 33. In addition, the base end portion of the high-height portion 311*c* of each of the two first pressing ribs 311 formed on the lower surface of the cylindrical portion 31 is connected to a tip end surface of an after-mentioned front plate 321 of the downwardly extending portion 32.

A height of the high-height portion 311*c* (an amount of protrusion in the Y direction) is larger than the height of the low-height portion 311*a*. Further, in a natural state that no external force is applied to the housing 3, a separation distance in the Y direction between an outer surface of the high-height portion 311*c* on the upper surface of the cylindrical portion 31 and an outer surface of the high-height portion 311*c* on the lower surface of the cylindrical portion 31 is slightly larger than an inner diameter in the Y direction (the height direction) of the insertion hole 43 of the shell 4. With this configuration, since the outer surface of each high-height portion 311*c* contacts with the inner peripheral surface of the insertion hole 43 of the shell 4 to be pressed toward the inner side when the cylindrical portion 31 is inserted into the insertion hole 43, the housing 3 is held by the shell 4. Further, since the housing 3 is made of the insulating material having elasticity, the cylindrical portion 31 can be elastically deformed toward the inner side. Thus, when the housing 3 is inserted into the insertion hole 43, the outer surface of the high-height 311*c* of each of the four first pressing ribs 311 is pressed toward the inner side by the inner peripheral surface of the insertion hole 43, and thereby the portion of the cylindrical portion 31 where each high-height portion 311*c* is formed is elastically deformed toward the inner side.

Since the portion of the cylindrical portion 31 where each high-height portion 311*c* is formed is elastically deformed toward the inner side, the inner surface of the insertion hole 33 is in surface contact with the outer surface (the base end surface) of the rear slope portion 262 of each of the first protruding portions 26 of the contact pin 2 as shown in FIG. 16C. As a result, since the inner surface of the insertion hole 33 is pressed against the rear slope portion 262 of each of the first protruding portions 26 of the contact pin 2 from the base side toward an oblique and inner side direction (a direction of an arrow A in FIG. 16C), the contact pin 2 is held in the insertion hole 33.

Referring back to FIG. 13, a position of each of the four first pressing ribs 311 and a length of extension of each of the four first pressing ribs 311 in the insertion and extraction direction of the mating connector 200 are appropriately set so that the inner surface of the insertion hole 33 can be elastically deformed toward the inner side. An amount of elastic deformation of the inner surface of the insertion hole 33 toward the inner side is sufficient to come into surface contact with the rear slope portions 262 of the contact pin 2 from the base side thereof to hold the contact pin 2 in the insertion hole 33 of the housing 3.

The pair of second pressing ribs 312 are formed for preventing each contact pin 2 from being shifted in the insertion hole 33 of the housing 3 toward the base side and removed from the insertion hole 33 of the housing 3 in the state that the cylindrical portion 31 of the housing 3 is inserted into the insertion hole 43 of the shell 4. Further, the pair of second pressing ribs 312 are formed for preventing the cylindrical portion 31 from being removed from the insertion hole 43 in the state that the cylindrical portion 31 is inserted into the insertion hole 43. Additionally, the pair of second pressing ribs 312 are formed for improving signal transmission characteristics of the electrical connector 1 by stabilizing a separation distance in the width direction (the X direction) between the pair of contact pins 2 respectively held in the pair of insertion holes 33 of the housing 3.

As shown in FIG. 13, the pair of second pressing ribs 312 are protruding portions which linearly extend in the insertion and extraction direction of the mating connector 200 and are spaced apart from each other. The pair of second pressing ribs 312 face each other at an angular interval of 180 degrees through the pair of insertion holes 33 and the wall portion 35 formed between the pair of insertion holes 33. The pair of second pressing ribs 312 are respectively formed on both side surfaces (both side surfaces located in the X direction) of the cylindrical portion 31.

Each of the second pressing ribs 312 includes a low-height portion 312*a* located on the tip end portion of the cylindrical portion 31, an inclined portion 312*b* extending from the low-height portion 312*a* toward the outside and a high-height portion 312*c* extending from the inclined portion 312*b* toward the base side.

The low-height portion 312*a* is a protruding portion located on the tip end portion of the cylindrical portion 31 and extending at a constant height from the tip end portion toward the base side. A height (the length in the Y direction) of the low-height portion 312*a* is set so that the low-height portion 312*a* does not contact with the inner peripheral surface of the insertion hole 43 of the shell 4 in the state that the housing 3 is held in the shell 4. The inclined portion 312*b* is located between the low-height portion 312*a* and the high-height portion 312*c*, and is formed so as to gradually increase its height from the tip side toward the base side. Further, a tip end portion of the inclined portion 312*b* is continuous with a base end portion of the low-height portion 312*a*, and a base end portion of the inclined portion 312*b* is continuous with a tip end portion of the high-height portion 312*c*. When the cylindrical portion 31 of the housing 3 is inserted into the insertion hole 43 of the shell 4, the inner peripheral surface of the insertion hole 43 of the shell 4 slides on an outer surface (the surface perpendicular to the Y direction) of each of the inclined portions 312*b*, and thereby the insertion of the cylindrical portion 31 of the housing 3 into the insertion hole 43 is guided.

The high-height portion 312*c* is a portion which is located closer to the base side than the inclined portion 312*b*. The high-height portion 312*c* protrudes toward the outside so as to extend at a constant height from the base end portion of the inclined portion 312*b* toward the base side. In the state that the housing 3 is held by the shell 4, the high-height portion 312*c* contacts with the inner peripheral surface of the insertion hole 43 of the shell 4 to prevent the cylindrical portion 31 of the housing 3 from being removed from the insertion hole 43. Further, since the high-height portion 312*c* contacts with the inner peripheral surface of the insertion hole 43, the high-height portion 312*c* is pressed by the inner peripheral surface of the insertion hole 43 toward the inner side. When the high-height portion 312*c* is pressed toward the inner side, a portion of the cylindrical portion 31 where the high-height portion 312*c* is formed is elastically deformed toward the inner side.

A height of the high-height portion 312*c* (the length in the X direction) is larger than the height of the low-height portion 312*a*. Further, in the natural state that no external force is applied to the housing 3, a total length of an outer diameter of the cylindrical portion 31 in the width direction (the X direction) and the heights (the amounts of protrusion) of the pair of high-height portions 312*c* is slightly larger than the inner diameter of the insertion hole 43 of the shell 4 in the width direction. With this configuration, the outer surface of each of the high-height portions 312*c* contacts with the inner peripheral surface of the insertion hole 43 of the shell 4 to be pressed toward the inner side when the cylindrical portion 31 is inserted into the insertion hole 43, and thereby the housing 3 is held by the shell 4. Further, the cylindrical portion 31 can be elastically deformed toward the inner side as described above. Since the outer surface of the high-height portion 312*c* contacts with the inner peripheral surface of the insertion hole 43 to be pressed by the inner peripheral surface of the insertion hole 43 when the housing 3 is inserted into the insertion hole 43, the portion of the cylindrical portion 31 where the high-height portion 312*c* is formed is elastically deformed toward the inner side.

In the illustrated embodiment, although the pair of second pressing ribs 312 are respectively formed on both side surfaces of the cylindrical portion 31 of the housing 3, the number and positions of the pair of second pressing ribs 312 are not limited thereto. An aspect in which one, three, or more second pressing ribs 312 are formed on a side surface or both side surfaces of the cylindrical portion 31 is also within the scope of the present disclosure.

The downwardly extending portion 32 is a portion for containing the downwardly extending portion 24 of each contact pin 2 therein when the contact pins 2 are held by the housing 3. As shown in FIGS. 13 and 14, the downwardly extending portion 32 includes the front plate 321 extending from a lower portion of the base end portion of the cylindrical portion 31 toward the lower side, a pair of wall portions 322 extending from both width-direction (the X direction) edges of the front plate 321 toward the base side, a first cutout portion 323 formed at a portion adjacent to an upper portion on the tip end surface of the front plate 321 and a lower portion of the base end portion of the cylindrical portion 31, and a central wall portion 324 extending between the pair of side wall portions 322 from a center of the front plate 321 in the width direction toward the base side so as to be spaced apart from each of the side wall portions 322.

The front plate 321 is a plate-like portion vertically extending from the lower portion of the base end portion of the cylindrical portion 31 toward the lower side. When the insertion of the cylindrical portion 31 of the housing 3 into the insertion hole 43 of the shell 4 from the base side thereof is completed, the tip end surface of the front plate 321 abuts against the body portion 41 of the shell 4 as shown in FIG. 7.

As shown in FIG. 13, the first cutout portion 323 is formed at the portion adjacent to the upper portion on the tip end surface of the front plate 321 and the lower portion of the base end portion of the cylindrical portion 31 along the width direction (the X direction) of the front plate 321. The first cutout portion 323 is a concave portion functioning as a relief portion for an edge portion 414 (see FIG. 21) formed on the base side of the insertion hole 43 when the cylindrical portion 31 of the housing 3 is inserted into the insertion hole 43 of the shell 4.

As shown in FIG. 7, the first cutout portion 323 is spaced apart from the edge portion 414 of the shell 4 through a gap therebetween. The first cutout portion 323 is formed in the front plate 321 of the housing 3 in consideration of variations in the shape of the body portion 41 of the shell 4 in a manufacturing process and tolerances of parts. With this configuration, it is possible to prevent the edge portion 414 of the shell 4 from interfering with the front plate 32, and thereby the tip end surface of the front plate 321 is in close contact with the body portion 41. Thus, it is possible to prevent backlash of the housing 3 in the shell 4.

As shown in FIGS. 7 and 14, the front plate 321 has an abutting portion 325 formed on the base end surface of the front plate 321 and a second cutout portion 326 formed on the base end surface of the front plate 321 below the abutting portion 325. The abutting portion 325 is a flat portion extending from the base end portion of the lower surface of the insertion hole 33 toward the lower side. Once the tip end surface of the downwardly extending portion 24 of the contact pin 2 abuts against the base end surface of the abutting portion 325 when the contact pin 2 is press-fitted into the insertion hole 33 of the housing 3, press-fitting of the contact pin 2 into the insertion hole 33 is completed.

The second cutout portion 326 is a concave portion having a flat portion downwardly extending from a lower portion of the abutting portion 325. Further, the second cutout portion 326 is located at a position corresponding to a position of the fourth cut mark 28*d* of the contact pin 2. As shown in FIG. 7, the base end surface of the second cutout portion 326 is located closer to the tip side than the base end surface of the abutting portion 325. Further, the base end surface of the second cutout portion 326 is located closer to the tip side than a tip end surface of the fourth cut mark 28*d* of the downwardly extending portion 24. Thus, in the state that the press-fitting of the contact pin 2 is completed, the base end surface of the abutting portion 325 abuts against the tip end surface of the downwardly extending portion 24. On the other hand, the base end surface of the second cutout portion 326 faces the tip end surface of the fourth cut mark 28*d* through a gap therebetween and does not contact with the tip end surface of the fourth cut mark 28*d* in this state. Since the base end surface of the second cutout portion 326 is located closer to the tip side than the base end surface of the abutting portion 325, it is possible to prevent the fourth cut mark 28*d* from contacting with the front plate 321 (the second cutout portion 326) by forming the second cutout portion 326 on the base end surface of the front plate 321. If the second cutout portion 326 is not formed on the base end surface of the front plate 321, the tip end surface of the fourth cut mark 28*d* contacts with the base end surface of the front plate 321 in the state that the press-fitting of the contact pin 2 into the insertion hole 33 of the housing 3 is completed. Thus, the base end surface of the abutting portion 325 cannot abut against the tip end surface of the downwardly extending portion 24 of the contact pin 2. That is, the base end surface of the abutting portion 325 cannot be in close contact with the tip end surface of the downwardly extending portion 24. In this case, since the contact pin 2 is unstably held in the housing 3, the contact pin 2 rattles in the housing 3. In the present disclosure, since the second cutout portion 326 is formed on the base end surface of the front plate 321, the base end surface of the abutting portion 325 is in close contact with the tip end surface of the downwardly extending portion 24 to prevent the backlash of the contact pin 2 from occurring in the housing 3.

As shown in FIGS. 13 and 14, the pair of side wall portions 322 are plate-like portions respectively extending from both width-direction (the X direction) edges of the front plate 321 toward the base side. As shown in FIG. 14, the base end surface of the front plate 321 (the base end surfaces of the abutting portion 325 and the second cutout portion 326), inner surfaces of the pair of wall portions 322 and outer surfaces of the central wall portion 324 define two internal spaces in which the downwardly extending portions 24 of the pair of contact pins 2 are respectively contained. When the pair of contact pins 2 are held by the housing 3, the downwardly extending portions 24 of the pair of contact pins 2 are respectively located in the two internal spaces of the downwardly extending portion 32 of the housing 3. The central wall portion 324 is a plate-like portion extending from the center of the front plate 321 in the width direction (the X direction) toward the base side. The central wall portion 324 is located between the pair of side wall portions 322 and faces each of the side wall portions 322 with a gap therebetween. The central wall portion 324 separates the above-mentioned two internal spaces.

Referring back to FIG. 13, the pair of insertion holes 33 are arranged in parallel in the width direction (the X direction) and extend in the insertion and extraction direction of the mating connector 200 so as to be spaced apart from each other through the wall portion 35. Each of the insertion holes 33 passes through the cylindrical portion 31 in the insertion and extraction direction (the Z direction) of the mating connector 200. As described above, the pair of contact pins 2 are respectively press-fitted into the pair of insertion holes 33. Each of the insertion holes 33 has a shape corresponding to a shape of the horizontally extending portion 21 of the contact pin 2. Further, each of the insertion holes 33 has a substantially rectangular planar shape in the planar view viewed from the Z direction.

As shown in FIGS. 7 and 8, the horizontally extending portion 21 of each contact pin 2 is held in the insertion hole 33. The insertion hole 33 has a first wall surface (an inner wall surface) 331 which is a flat surface perpendicular to the X direction and a second wall surface (an outer wall surface) 332 which is a flat surface facing the first wall surface 331. Further, in the state in which the horizontally extending portion 21 is contained in the insertion hole 33, the first wall surface 331 faces the third surface 213 of the horizontally extending portion 21 and the second wall surface 332 faces the fourth surface 214 of the horizontally extending portion 21 as shown in an upper side of FIG. 19.

As shown in FIG. 15A, the flat receiving portion 34 is a flat portion formed on the first wall surface 331 of the insertion hole 33. The receiving portion 34 protrudes from the first wall surface 331 toward the inner side (the X direction) of the insertion hole 33 and linearly extends in the insertion and extraction direction (the Z direction) of the mating connector 200. The receiving portion 34 has a trapezoidal planar shape in a planar view (cross sectional view) viewed from the insertion and extraction direction (the Z direction) of the mating connector 200. The receiving portion 34 faces the third surface 213 of the horizontally extending portion 21 of the contact pin 2. The receiving portion 34 includes a flat portion 341 having a constant width (an amount of protrusion in the X direction) and a pair of leg portions 342 extending in an oblique direction with respect to the flat portion 341 and the first wall surface 331 from both end portions of the flat portion 341 in the Y direction toward the first wall surface 331 of the insertion hole 33. Each of the leg portions 342 is an inclined portion formed at both end portions of the flat portion 341 in the Y direction and inclined from the flat portion 341 toward the first wall surface 331.

In the illustrated aspect, although the receiving portion 34 protruding from the first wall surface 331 toward the inside of the insertion hole 33 is formed on the first wall surface 331, a shape of the receiving portion 34 is not limited thereto. For example, the receiving portion 34 may not include the pair of leg portions 342, and the flat portion 341 and the first wall surface 331 of the insertion hole 33 may be located on the same plane as shown in FIG. 15B. As shown in FIG. 15B, a portion shown with the dotted line is the flat portion 341. In this case, a portion of the first wall surface 331 facing the third surface 213 of the horizontally extending portion 21 of the contact pin 2 functions as the flat portion 341 of the receiving portion 34. The scope of the disclosure also involves an aspect in which the receiving portion 34 does not protrude from the first wall surface 331.

Referring back to FIG. 13, the wall portion 35 is located between the first wall surfaces 331 of the pair of insertion holes 33. The wall portion 35 is a plate-like portion linearly extending along the insertion and extraction direction of the mating connector 200 (the Z direction) inside the cylindrical portion 31 so as to separate (partition) the pair of insertion holes 33 adjacent to each other in the width direction.

As shown in FIG. 14, the pair of contact pins 2 are respectively press-fitted from the base side into the pair of insertion holes 33 of the housing 3. Next, locking of each contact pin 2 in the insertion hole 33 by contacting between the pair of first protruding portions 26 of the contact pin 2 and the inner surface of the insertion hole 33 will be described with reference to FIGS. 16A to 16C.

In the natural state that no external force is applied to the housing 3, a separation distance in the Y direction between the outer surfaces of the flat portions 263 of the pair of first protruding portions 26 of the contact pin 2 is larger than a length in the Y direction of the insertion hole 33 of the housing 3 in the planar view viewed from the X direction as described above. Thus, as shown in FIG. 16A, the tip end portion of the flat portion 263 of each of the first protruding portions 26 contacts with the inner surface of the insertion hole 33.

An arrow in FIG. 16A indicates a direction of movement of the contact pin 2 in the insertion hole 33. Since the tip end portion of the flat portion 263 of each of the first protruding portions 26 contacts with the inner surface of the insertion hole 33 when the contact pin 2 is press-fitted into the insertion hole 33, the tip end portion of the flat portion 263 of each of the first protruding portions 26 moves in the insertion hole 33 toward the direction of the arrow in FIG. 16A while shaving the inner surface of the insertion hole 33. FIG. 16B shows the state that the press-fitting of the contact pin 2 into the insertion hole 33 is completed.

The shavings S are generated by the tip end portions of the flat portions 263 of the contact pin 2 shaving the inner surface of the insertion hole 33 of the housing 3. If the shavings S are scattered in the insertion hole 33 and are randomly attached to a surface of the horizontally extending portion 21 of the contact pin 2, a holding position and a holding posture of the contact pin 2 in the insertion hole 33 are changed. Thus, it is difficult to stabilize the holding position and the holding posture of the contact pin 2 in the insertion hole 33. Further, if the holding position and the holding posture of the contact pin 2 in the insertion hole 33 are changed, the separation distance between the two contact pins 2 held by the housing 3 is unstable. As a result, the signal transmission characteristics of the electrical connector 1, in particular, the signal transmission characteristics in the high frequency band deteriorate. In order to deal with such a problem, the pair of concave portions 27 are formed on the horizontally extending portion 21 of the contact pin 2 in the electrical connector 1 of the present disclosure.

As shown in FIG. 16B, the shavings S are contained in the pair of concave portions 27 respectively formed adjacent to the tip sides of the pair of first protruding portions 26. Thus, the shavings S are not scattered in the insertion hole 33 and do not randomly attach to the surface of the horizontally extending portion 21. With this configuration, the holding position and the holding posture of the contact pin 2 in the insertion hole 33 can be stabilized. As a result, it is possible to stabilize the separation distance between the pair of contact pins 2 held by the housing 3 to prevent the decrease in the signal transmission characteristics of the electrical connector 1, in particular, the decrease in the signal transmission characteristics in the high frequency band.

Further, in the state that the contact pin 2 is press-fitted into the insertion hole 33 shown in FIG. 16B, the cylindrical portion 31 containing the contact pin 2 therein is inserted into the insertion hole 43 of the shell 4, then shifting to a state shown in FIG. 16C. The four first pressing ribs 311 of the cylindrical portion 31 are pressed toward the inner side by the inner peripheral surface of the insertion hole 43 when the cylindrical portion 31 is inserted into the insertion hole 43, and thereby the housing 3 is held by the shell 4. Further, the contact pin 2 is pressed from the outside by the inner surface of the insertion hole 33 since the portions of the cylindrical portion 31 where the four first pressing ribs 311 are formed are deformed toward the inner side, and thereby the contact pin 2 is held in the insertion hole 33.

Further, the portions where the four first pressing ribs 311 are formed are elastically deformed toward the inner side when the four first pressing ribs 311 are pressed by the inner surface of the insertion hole 43 of the shell 4, so that the inner surface of the insertion hole 33 is in surface contact with the rear slope portion 262 and the rear connection portion 265 of each of the first protruding portions 26 of the contact pin 2. As a result, since the inner surface of the insertion hole 33 is pressed against the rear slope portion 262 and the rear connection portion 265 of each of the first protruding portions 26 of the contact pin 2 from the base side toward the oblique and inner side direction (the direction of the arrow A in FIG. 16C), the contact pin 2 is held in the insertion hole 33.

With this configuration, it is possible to increase the locking force of the contact pin 2 in the insertion hole 33 of the housing 3. Thus, even when strong force is applied to the contact pin 2 toward the base side (the −Z direction), it is possible to reliably prevent the contact pin 2 from being shifted toward the base side in the insertion hole 33 or removed from the insertion hole 33 since the rear slope portion 262 and the rear connection portion 265 of the contact pin 2 are firmly supported by the inner surface of the insertion hole 33 in the oblique and inner side direction from the base side. Further, since the rear slope portion 262 and the rear connection portion 265 are in surface contact with the inner surface of the insertion hole 33, a contact area between the rear slope portion 262 and the rear connection portion 265 and the inner surface of the insertion hole 33 can be increased. Thus, when the strong force is applied to the contact pin 2 toward the base side (the −Z direction), it is possible to reduce force per unit area applied to the inner surface of the insertion hole 33. As a result, it is possible to prevent the inner surface of the insertion hole 33 from being shaved by the rear slope surface portion 262 and the rear connection portion 265.

As described above, the contact pin 2 of the electrical connector 1 of the present disclosure includes the first protruding portion 26. The advantage of forming the first protruding portion 26 having such a configuration in the horizontally extending portion 21 of the contact pin 2 will be explained by comparison with the contact pin 2' having a first protruding portion 26' of the reference shape shown in FIG. 17.

FIG. 17 is a YZ planar view of the contact pin 2' having a pair of first protruding portions 26' of a reference shape with a partially enlarged view of an upper first protruding portion 26' of the reference shape. The contact pin 2' shown in FIG. 17 has the same configuration as the contact pin 2 described with reference to FIGS. 10 and 11 except that a shape of the first protruding portion 26' is different from the shape of the protruding portion 26 described above. Since the pair of protruding portions 26' (the upper first protruding portion 26' and the lower first protruding portion 26') have the same configuration, the upper first protruding portion 26' in FIG. 17 will be described in the following description as a representative.

The upper first protruding portion 26' includes the front slope portion 261 obliquely extending in an upper right direction in FIG. 17 from the first surface 211 of the horizontally extending portion 21, a base side wall portion 262' which is a flat surface perpendicular to the insertion and extraction direction of the mating connector 200 (the Z direction) and located closer to the base side than the front slope portion 261, the flat portion 263 linearly extending between the front slope portion 261 and the base side wall portion 262' in the insertion and extraction direction of the mating connector 200, the front connection portion 264 connecting the base end portion of the front slope portion 261 and the tip end portion of the flat portion 263 and a corner portion 265' connecting an upper end portion of the base side wall portion 262' and the base end portion of the flat portion 263.

Since the front slope portion 261, the flat portion 263 and the front connection portion 264 shown in FIG. 17 have the same shapes, positions, and configurations as those of the front slope portion 261, the flat portion 263, and the front side connecting portion 264 described with reference to FIGS. 10 and 11, description for the front slope portion 261, the flat portion 263 and the front connection portion 264 will be omitted.

The base side wall portion 262' is a flat wall portion perpendicular to the insertion and extraction direction of the mating connector 200 (the Z direction) so as to linearly extend from the first surface 211 of the horizontally extending portion 21 toward the upper side (the +Y direction). The base side wall portion 262' is located closer to the base side than the flat surface 263 and connected with the base end portion of the flat portion 263 through the corner portion 265'. The corner portion 265' is formed by intersection of an outer surface of the base side wall portion 262' perpendicular to the insertion and extraction direction of the mating connector 200 (the Z direction) and an outer surface of the flat portion 263 extending in a direction perpendicular to the height direction. The corner portion 265' has an angle of about 90 degrees.

Similar to FIGS. 16A to 16C which are views for explaining the engagement of the contact pin 2 in the insertion hole 33 of the housing 3, FIGS. 18A to 18C are views for explaining engagement of the contact pin 2' in the insertion hole 33 of the housing 3. The contact pin 2' has the pair of first protruding portions 26' of the reference shapes described with reference to FIG. 17. An Arrow in FIG. 18A indicates a direction of movement of the contact pin 2' in the insertion hole 33.

As shown in FIG. 18A, the flat portion 263 of each of the first protruding portions 26' of the contact pin 2' contacts with the inner surface of the insertion hole 33 when the contact pin 2' is press-fitted into the insertion hole 33. Further, the tip end portion of the flat portion 263 of each of the first protruding portions 26' contacts with the inner surface of the insertion hole 33 when the contact pin 2' is press-fitted into the insertion hole 33 to move in the insertion hole 33 toward the direction of the arrow in FIG. 18A while shaving the inner surface of the insertion hole 33. FIG. 18B shows a state that press-fitting of the contact pin 2' into the insertion hole 33 is completed.

Further, in the state that the contact pin 2' is press-fitted into the insertion hole 33, the cylindrical portion 31 containing the contact pin 2' therein is inserted into the insertion hole 43 of the shell 4, then shifting to a state shown in FIG. 18C. When the cylindrical portion 31 is inserted into the insertion hole 43 of the shell 4, the four first pressing ribs 311 of the housing 3 are pressed toward the inner side by the inner peripheral surface of the insertion hole 43 of the shell 4 as shown in FIG. 18C. Thus, the portions where the four first pressing ribs 311 are formed are deformed toward the inner side, so that the corner portion 265' and the base side wall portion 262' of each of the protruding portions 26' contact with the inner surface of the insertion hole 33. As a result, the corner portion 265' and the base side wall portion 262' of each of the protruding portions 26' are obliquely pressed from the base side toward the inner side (in an arrow B direction in FIG. 18C) by the inner surface of the insertion hole 33, and thereby the contact pin 2' is held in the insertion hole 33. With this configuration, it is possible to lock the contact pin 2' in the insertion hole 33.

Further, when the force is applied to the contact pin 2' toward the base side (the −Z direction), the corner portion 265' is slightly engaged with the inner peripheral surface of the insertion hole 33 of the housing 3. Thus, it is possible to prevent the contact pin 2' from being shifted toward the base side in the insertion hole 33 and removed from the insertion hole 33.

However, with such a configuration of the contact pin 2', a contact area between the base side wall portion 262' and the corner portion 265' of the contact pin 2' and the insertion hole 33 of the housing 3 shown in FIG. 18C is smaller than the contact area between the rear slope portion 262 and the rear connection portion 265 of the contact pin 2 and the insertion hole 33 of the housing 3 shown in FIG. 16C. Thus, when the strong force is applied to the contact pin 2' toward the base side (the −Z direction), the force is concentrated at a contact portion between the base side wall portion 262' and the corner portion 265' of the contact pin 2' and the inner surface of the insertion hole 33 of the housing 3, so that the inner surface of the insertion hole 33 is shaved by the base side wall portion 262' and the corner portion 265'. As a result, since the contact pin 2' cannot be locked in the insertion hole 33, there arises problems in that the contact pin 2' is shifted toward to the base side in the insertion hole 33, and further the contact pin 2' is removed from the insertion hole 33.

In view of the above-described problems, each of the protruding portions 26 shown in FIGS. 10 and 11 includes the rear slope portion 262 at the base end portion of the protruding portion 26. Further, the outer surface of the rear connection portion 265 connecting the flat portion 263 and the rear slope portion 262 is the curved surface. With this configuration, since the rear slope portion 262 and the rear connection portion 265 are in surface contact with the inner surface of the insertion hole 33 of the housing 3 as shown in FIG. 16C in the state that the cylindrical portion 31 of the housing 3 is inserted into the insertion hole 43 of the shell 4 and the housing 3 is held by the shell 4, the contact area between the inner surface of the insertion hole 33 and the rear slope portion 262 and the rear connection portion 265 is larger than the contact area between the base side wall portion 262' and the corner portion 265' of the contact pin 2' and the insertion hole 33 of the housing 3 shown in FIG. 18C. Although the problem that the inner surface of the insertion hole 33 is shaved by the base side wall portion 262' and the corner portion 265' occurs when using the contact pin 2' having the protruding portion 26' of the reference shape described with reference to FIG. 17, this problem can be solved by the contact pin 2 including the protruding portion 26 of the present disclosure.

Next, the locking of each of the contact pins 2 in each of the insertion holes 33 by the housing 3 sandwiching the contact pin 2 from the width direction (the X direction) will be described with reference to FIG. 19. As shown in the upper side of FIG. 19, a width (the length in the X direction) of the insertion hole 33 of the housing 3 is set to be wider than a width of the contact pin 2 in consideration of a tolerance of the contact pin 2. Thus, in the state that the press-fitting of the contact pin 2 into the insertion hole 33 is completed, there are gaps between the contact pin 2 and the first wall surface 331 of the insertion hole 33 and between the contact pin 2 and the second wall surface 332 of the insertion hole 33. More specifically, the gaps exist between the third surface 213 of the contact pin 2 and the first wall surface 331 of the insertion hole 33, and between the fourth surface 214 of the contact pin 2 and the second wall surface 332 of the insertion hole 33. By providing the gaps between the contact pin 2 and the first wall surface 331 of the insertion hole 33 and between the contact pin 2 and the second wall surface 332 of the insertion hole 33, it is possible to reliably press-fit the contact pin 2 into the insertion hole 33 even if a size of the contact pin 2 changes due to the tolerance at the time of manufacturing the contact pin 2. On the other hand, there is a problem that a holding position of the contact pin 2 in the X direction is unstable since the contact pin 2 is rattled in the insertion hole 33 when the gaps exist between the contact pin 2 and the first wall surface 331 and between the contact pin 2 and the second wall surface 332 of the insertion hole 33.

The flat portion 341 of the receiving portion 34 protrudes from the first wall surface 331 of the insertion hole 33 toward the inner side and contacts with the third surface 213 of the contact pin 2 to support the contact pin 2 from the inner side. Further, as shown in a lower side of FIG. 19, when the cylindrical portion 31 of the housing 3 is inserted into the insertion hole 43 of the shell 4, the outer surface (the surface perpendicular to the X direction) of the high-height portion 312*c* of each of the second pressing ribs 312 contacts with the inner peripheral surface of the insertion hole 43 to be pressed toward the inner side. As a result, the portion of the cylindrical portion 31 where the high-height portion 312*c* is formed is elastically deformed toward the inner side.

When the portion of the cylindrical portion 31 where the high-height portion 312*c* is formed is elastically deformed toward the inner side, a portion of the second wall surface 332 of the insertion hole 33 where the high-height portion 312*c* of the cylindrical portion 31 is formed is elastically deformed toward the inner side. As a result, the second wall surface 332 of the insertion hole 33 contacts with the fourth surface 214 of the contact pin 2 from the outside to be pressed against the contact pin 2. With this configuration, the horizontally extending portion 21 of the contact pin 2 is pressed onto the flat portion 341 of the receiving portion 34 formed on the first wall surface 331 of the insertion hole 33. Thus, the horizontally extending portion 21 of the contact pin 2 is firmly sandwiched between the receiving portion 34 of the housing 3 and the second wall surface 332 of the housing 3.

Since this configuration can prevent backlash of the contact pin 2 in the X direction after the electrical connector 1 is assembled, it is possible to accurately perform positioning of the contact pin 2 in the insertion hole 33 of the housing 3, and thereby it is possible to reliably keep the separation distance between the pair of contact pins 2 in the X direction constant. Since the separation distance between the pair of contact pins 2 in the X direction is kept constant, it is possible to stabilize the signal transmission characteristics of the electrical connector 1. Further, since the horizontally extending portion 21 of the contact pin 2 is sandwiched by the housing 3 in the insertion hole 33, it is possible to increase the locking force of the contact pin 2 in the insertion hole 33 of the housing 3 in the state that the cylindrical portion 31 of the housing 3 is inserted into the insertion hole 43 of the shell 4. As a result, it is possible to prevent the contact pin 2 from being shifted toward the base side in the housing 3 and removed from the housing 3.

Referring back to FIG. 9, the shell 4 has a function as a housing for containing each component of the electrical connector 1 therein and a function as an electrical path for electrically connecting with a ground terminal 110 on the circuit board 100. As shown in FIGS. 20 and 21, the shell 4 is a box-like member made of metallic material.

The shell 4 includes a body portion 41 constituted of a front plate 411, a pair of side walls 412 and a top plate 413, a cylindrical portion 42 extending from a tip end surface of the front plate 411 of the body portion 41 toward the tip side, a positioning protrusion 421 formed on the tip end surface of the front plate 411 of the body portion 41 at a portion adjacent to an upper portion and a lower portion of the base end portion of the cylindrical portion 42, the insertion holes 43 passing through the front plate 411 of the body portion 41, four ground terminals 44 extending from a lower end portion of the body portion 41 toward the lower side, a pair of wall portions 45 formed on each of the side walls 412 of the body portion 41 so as to extend in the Y direction and be spaced apart from each other, a cover receiving portion 46 formed on an outer surface of each of the side walls 412, an engagement recess 47 formed on a base end portion of the cover receiving portion 46 and a partition wall 48 separating the cover receiving portion 46 and the engagement recess 47.

The body portion 41 includes the front plate 411, the pair of side walls 412 respectively extending from wide-direction end portions of the front plate 411 toward the base side and the top plate 413 extending from an upper end portion of the front plate 411 toward the base side. The body portion 41 has a box-like shape opened toward the base side and the lower side. The components of the electrical connector 1 are contained in an internal space of the body portion 41 defined by inner surfaces of the front plate 411, the pair of side walls 412 and the top plate 413.

The cylindrical portion 42 is a cylindrical member formed so as to protrude from the tip end surface of the front plate 411 of the body portion 41 toward the tip side and communicates with the insertion hole 43. The cylindrical portion 42 serves as an external conductor covering the cylindrical portion 31 of the housing 3 from the outside. Further, when the mating connector 200 is coupled with the electrical connector 1, the cylindrical portion 42 contacts with an outer contact 240 (see FIG. 24) of the mating connector 200 to equalize a ground potential of the electrical connector 1 and a ground potential of the mating connector 200.

As shown in FIG. 20, the positioning protrusion 421 protrudes from the tip end surface of the front plate 411 of the body portion 41. Further, the positioning protrusion 421 is formed so as to extend from the upper surface and the lower surface of the base end portion of the cylindrical portion 42 toward the outside (the Y direction). An upper end surface of the positioning protrusion 421 is located on the same plane as an upper surface of the top plate 413. The positioning protrusion 421 is provided for positioning the cover 5 with respect to the shell 4. The positioning protrusion 421 is formed at a position and in a shape corresponding to those of an after-mentioned pair of positioning recesses 52 (see FIG. 23) of the cover 5.

The insertion hole 43 is formed so as to pass through the front plate 411 of the body portion 41 in the insertion and extraction direction (the Z direction) of the mating connector 200. Further, a width of an inner diameter of the insertion hole 43 (the length in the X direction) is larger than a height of the inner diameter of the insertion hole 43 (the length in the Y direction). The insertion hole 43 has a rectangular planar shape with rounded corners, which corresponds to the planar shape of the cylindrical portion 31 of the housing 3.

As shown in FIG. 21, an upper portion of the inner surface of the insertion hole 43 is continuous with the inner surface of the top plate 413. Both side portions (portions in the X direction) of the inner surface of the insertion hole 43 are respectively continuous with the inner surfaces of the pair of side walls 412. The insertion hole 43 includes two first guide portions 431 formed in the upper portion of the inner surface of the insertion hole 43 for respectively guiding the upper two of the four first pressing ribs 311 of the housing 3, and a pair of second guide portions 432 formed on both side portions of the inner surface of the insertion hole 43 for respectively guiding the pair of second pressing ribs 312 of the housing 3.

The two first guide portions 431 are located on the inner surface of the top plate 413, and are concave portions formed so as to linearly extend in the insertion and extraction direction (the Z direction) of the mating connector 200. The two first guide portions 431 are formed at positions respectively corresponding to the positions of the upper two of the four first pressing ribs 311 formed on the outer peripheral surface of the cylindrical portion 31. When the cylindrical portion 31 of the housing 3 is inserted from the base side of the body portion 41 into the insertion hole 43 of the body portion 41, the upper two of the four first pressing ribs 311 are respectively guided by the two first guide portions 431.

The pair of second guide portions 432 are respectively located on the inner surfaces of the pair of side walls 412 of the body portion 41. The pair of second guide portions 432 are concave portions formed so as to linearly extend in the insertion and extraction direction (the Z direction) of the mating connector 200. Further, the pair of second guide portions 432 are formed at positions corresponding to the positions where the pair of second pressing ribs 312 are formed on the outer peripheral surface of the cylindrical portion 31. When the cylindrical portion 31 of the housing 3 is inserted from the base side of the body portion 41 into the insertion hole 43 of the body portion 41, the pair of the second pressing ribs 312 are respectively guided by the pair of second guide portions 432. With this configuration, insertion of the housing 3 into the shell 4 is guided.

Further, as shown in FIG. 16C, when the cylindrical portion 31 of the housing 3 is inserted into the insertion hole 43 of the shell 4, the outer surface of the high-height portion 311*c* of each of the four first pressing ribs 311 of the housing 3 is pressed toward the inner side by the inner peripheral surface of the insertion hole 43. Aa a result, the portion of the cylindrical portion 31 where the high-height portion 311*c* is formed is elastically deformed toward the inner side.

Further, as shown in the lower side of FIG. 19, when the cylindrical portion 31 of the housing 3 is inserted into the insertion hole 43 of the shell 4, the outer surface of the high-height portion 312*c* of the pair of second pressing ribs 312 of the housing 3 is pressed toward the inner side by the inner peripheral surface of the insertion hole 43. Thus, the portion of the cylindrical portion 31 where the high-height portion 312*c* is formed is elastically deformed toward the inner side.

Referring back to FIGS. 20 and 21, the four ground terminals 44 are respectively connected to the corresponding ground terminals 110 (see FIG. 4) of the circuit board 100.

The shell 4 is electrically connected to the ground terminals 110 through the ground terminals 44.

The pair of wall portions 45 are formed on each of the side walls 412 of the body portion 41 for forming the cover receiving portion 46 for receiving each of an after-mentioned pair of protruding pieces 54 of the cover 5. One of the pair of wall portions 45 is formed on an upper side (the +Y direction) of each of the side walls 412, and the other is formed on a lower side (the −Y direction) of each of the side walls 412. The pair of wall portions 45 face each other through the cover receiving portions 46 therebetween. An inner surface of each of the wall portions 45 is connected with the partition wall 48 and defines a base end surface of the cover receiving portion 46. Each of the wall portions 45 extends from the tip end portion of the outer surface of the side wall 412 toward the base side. A width (the length in the Y direction) of each of the wall portions 45 gradually increases from the tip side toward the base side. The inner surface (the inner surface located in the Y direction) of each of the wall portions 45 is a flat inclined surface inclined from the tip side toward the partition wall 48 located on the base side.

The cover receiving portion 46 is formed on the outer surface of each of the side walls 412 of the body portion 41 and formed between the pair of wall portions 45. The cover receiving portion 46 has a function of receiving each of the protruding pieces 54 of the cover 5. The cover receiving portion 46 is defined by the outer surface of each of the side walls 412 of the body portion 41, inner surfaces (inner surfaces located in the Y direction) of the pair of wall portions 45 and a tip end surface of the partition wall 48. A Y-direction opening width of the cover receiving portion 46 gradually decreases from the tip side toward the base side. With this configuration, it is possible to guide attachment of the cover 5 to the shell 4.

The engagement recess 47 is a concave portion formed by cutting out a base side portion of each of the side walls 412 of the body portion 41. The cover receiving portion 46 and the engagement recess 47 is separated by the partition wall 48. As shown in FIG. 8, the bottom surface (a surface located in the X direction) of each of the engagement recesses 47 and each of after-mentioned engagement protrusions 55 of the cover 5 face each other with a gap therebetween in a state that the cover 5 is attached to the shell 4.

Each partition wall 48 is formed between the cover receiving portion 46 and the engagement recess 47, and separates the cover receiving portion 46 and the engagement recess 47. The partition wall 48 is provided for positioning the cover 5 with respect to the shell 4. Further, the partition wall 48 has a tapered shape whose length in the Z direction gradually decreases from the inner side toward the outside in the planar view viewed from the Y direction. As particularly clearly shown in FIG. 8, the tip end surface of the partition wall 48 is an inclined surface obliquely extending from the outer surface of the side wall 412 of the body portion 41 toward the outside and the base side. The base end surface of the partition wall 48 is a flat surface perpendicular to the outer surface of the cover receiving portion 46. The partition wall 48 is located between the pair of wall portions 45 so as to connect between the pair of wall portions 45.

Referring back to FIG. 9, the cover 5 is attached to the shell 4 and has a function of guiding coupling between the electrical connector 1 and the mating connector 200. As shown in FIGS. 22 and 23, the cover 5 includes a rectangular cylindrical body portion 51 which opens toward the tip side and the base side, the pair of positioning recesses 52 formed on the base end surface of the body portion 51, two protrusions 53 formed on a bottom surface (a surface perpendicular to the Z direction) of each of the positioning recesses 52, the pair of protruding pieces 54 extending from the body portion 51 toward the base side, the engagement protrusion 55 protruding from a base side edge portion of the inner surface of each of the protruding pieces 54 toward inner side and a receiving portion 56 formed on an upper surface of the body portion 51 for receiving a positioning convex portion 220 (see FIG. 4) of the mating connector 200.

The body portion 51 has a rectangular cylindrical shape which opens toward the tip side and the base side. When the mating connector 200 is inserted into a tip side opening of the body portion 51, the coupling between the electrical connector 1 and the mating connector 200 is guided. The body portion 51 further includes a base side opening 511 opening to the base side. The cylindrical portion 42 of the shell 4 is inserted from the base side through the base side opening 511.

As shown in FIG. 23, each of the positioning recesses 52 is a concave portion formed on the base end surface of the body portion 51. The pair of positioning recesses 52 have a function of receiving the positioning protrusion 421 of the shell 4 when the cover 5 is attached to the shell 4. One of the pair of positioning recesses 52 extends in the width direction along an upper end portion of the base side opening 511, and the other of the pair of positioning recesses 52 extends in the width direction along a lower end portion of the base side opening 511. The pair of positioning recesses 52 are respectively formed at positions and in shapes corresponding to those of the positioning protrusion 421 of the shell 4 described above. The pair of positioning recesses 52 are formed by cutting out the base end surface of the body portion 51 toward the tip side. The cover 5 is positioned with respect to the shell 4 by inserting the positioning protrusion 421 into the pair of positioning recesses 52. The two protrusions 53 protruding toward the base side are formed on the bottom surface of each of the positioning recesses 52. Thus, a total of four protrusions 53 are formed in the illustrated embodiment. When the cover 5 is attached to the shell 4, the four protrusions 53 abut against the positioning protrusion 421 of the shell 4. With this configuration, it is possible to stably perform the positioning of the cover 5 with respect to the shell 4.

The pair of protruding pieces 54 are plate-like portions respectively extending from base end portions of a pair of X-direction opposed side surfaces (wall portions) of the body portion 51 toward the base side. The pair of protruding pieces 54 face each other with a gap therebetween. Each of the protruding pieces 54 has a shape corresponding to the shape of each of the cover receiving portions 46 of the shell 4 described above. When the cover 5 is attached to the shell 4, the pair of protruding pieces 54 are respectively received in the pair of cover receiving portions 46.

Each of the engagement protrusions 55 engages with the engagement recess 47 formed in the shell 4, and the tip end surface of each of the engagement protrusions 55 abuts against the base end surface of the partition wall 48, so that the cover 5 is attached to the shell 4. The pair of engagement protrusions 55 are tapered portions respectively protruding from the base side edge portions of the inner surfaces of the pair of protruding pieces 54 toward the inner side.

Each of the engagement protrusions 55 includes an inclined portion 551 located on the base side and a flat portion 552 linearly extending from the tip end portion of the inclined portion 551. A base end surface of the inclined portion 551 is continuous with the base end portion of the protruding piece 54. A height (the length in the X direction) of the inclined portion 551 gradually increases from the base side toward the tip side. An inner surface of the inclined portion 551 is an inclined surface inclined from the base side toward the inner side and the tip side. When the cover 5 is attached to the shell 4, the inclined portion 551 slides on the tip end surface of the partition wall 48, and thereby the protruding piece 54 is gradually and elastically deformed toward the outside. The flat portion 552 linearly extends from the tip end portion of the inclined portion 551 and has a constant height from the base side toward the tip side. The tip end surface of the flat portion 552 is a flat surface perpendicular to the Z direction. The tip end surface of the flat portion 552 engages with the base end surface of the partition wall 48, so that the cover 5 is attached to the tip side portion of the shell 4.

The receiving portion 56 is formed on the upper surface of the body portion 51 and has a function of receiving the positioning convex portion 220 of the case 210 of the mating connector 200 (see FIG. 4). The receiving portion 56 includes an opening 561 through which the positioning convex portion 220 of the case 210 of the mating connector 200 is passed, a pair of guide portions 562 for sliding the positioning convex portion 220 of the mating connector 200 and for guiding the coupling between the electrical connector 1 and the mating connector 200, and a stop portion 563 for stopping the positioning convex portion 220 of the case 210 of the mating connector 200.

The opening 561 is a rectangular opening which opens in the insertion and extraction direction of the mating connector 200 (the Z direction). The mating connector 200 is inserted into the electrical connector 1 in a posture that the positioning convex portion 220 of the case 210 of the mating connector 200 is inserted into the opening 561 for positioning the mating connector 200 with respect to the electrical connector 1. The pair of guide portions 562 are plate-like portions extending from the upper surface of the body portion 51 toward the upper side and facing to each other. The positioning convex portion 220 of the case 210 of the mating connector 200 slides on inner surfaces of the pair of guide portions 562 for guiding the coupling between the electrical connector 1 and the mating connector 200. The stop portion 563 is a plate-like portion for connecting base end portions of the pair of guide portions 562 to each other. The stop portion 563 is a flat surface perpendicular to the insertion and extraction direction of the mating connector 200 (the Z direction). When the tip end portion of the positioning convex portion 220 of the case 210 of the mating connector 200 abuts against the stop portion 563, the insertion of the mating connector 200 with respect to the electrical connector 1 is restricted.

The electrical connector 1 including the above-described components can be assembled by the following exemplary process. First, a suitable press-fitting tool is used for respectively press-fitting the pair of contact pins 2 into the pair of insertion holes 33 of the housing 3. Since the insertion of the pair of contact pins 2 into the pair of insertion holes 33 of the housing 3 is performed in the same manner, a process for press-fitting one of the contact pins 2 into one of the insertion holes 33 of the housing 3 will be described below as a representative.

First, the contact portion 22 of the contact pin 2 is inserted into the insertion hole 33 of the housing 3. Next, the connection portion 23 of the contact pin 2 is pressed toward the tip side, so that the contact pin 2 is press-fitted into the insertion hole 33 of the housing 3. When the downwardly extending portion 24 of the contact pin 2 contacts with the abutting portion 325 of the housing 3, the press-fitting of the contact pin 2 into the insertion hole 33 is completed. In the same manner, the other contact pin 2 is press-fitted into the other insertion hole 33.

Next, the housing 3 in which the pair of contact pins 2 are press-fitted is inserted into the insertion hole 43 of the shell 4 from the base side thereof. First, the cylindrical portion 31 of the housing 3 is inserted into the insertion hole 43 from the base side. The insertion of the housing 3 into the insertion hole 43 is completed when the front plate 321 of the housing 3 contacts with the front plate 411 of the shell 4. In a state that the insertion of the housing 3 into the insertion hole 43 is completed, the outer surfaces of the high-height portions 311*c* of the four first pressing ribs 311 and the high-height portions 312*c* of the pair of second pressing ribs 312 formed on the cylindrical portion 31 contact with the inner peripheral surface of the insertion hole 43. As a result, the cylindrical portion 31 is fixed in the insertion hole 43.

Finally, the cover 5 is attached to the shell 4 from the tip side thereof. Specifically, the tip side portion of the shell 4 is press-fitted into the base side of the cover 5 in a posture that the pair of protruding pieces 54 of the cover 5 are respectively received by the pair of cover receiving portions 46 of the shell 4. At this time, the inclined portion 551 of each of the protruding pieces 54 respectively slides on the tip end surface of the partition wall 48 of the shell 4, and thereby the pair of protruding pieces 54 are elastically deformed and opened toward the outer side as the shell 4 is inserted into the cover 5. When each of the engagement protrusions 55 exceeds the base end surface of the partition wall 48, the pair of protruding pieces 54 are elastically restored toward the inner side, and thereby each of the engagement protrusions 55 engages with the partition wall 48 by snap-fitting. This snap-fitting engagement completes the attachment of the cover 5 to the tip side portion of the shell 4. In this state, the flat portion 552 of the engagement protrusion 55 faces the engagement recess 47 with a gap therebetween as shown in FIG. 8. Further, the tip end surface of the flat portion 552 of the engagement protrusion 55 is engaged with the base end surface of the partition wall 48. With this configuration, it is possible to prevent the shell 4 from being removed from the cover 5 toward the base side. Although an example of the assembling procedure of the electrical connector 1 has been described in detail so far, the assembling procedure of the electrical connector 1 of the present disclosure is not limited thereto, and the electrical connector 1 can be assembled by any suitable assembling procedure.

FIG. 24 is a YZ plane cross-sectional view containing the contact pin 2 in the state that the electrical connector 1 and the mating connector 200 are coupled with each other. As shown in FIG. 24, when the mating connector 200 is inserted into the electrical connector 1 from the tip side, the electrical connector 1 and the mating connector 200 are coupled with each other. In this state, the contact portion 22 of the contact pin 2 of the electrical connector 1 contacts with the corresponding contact pin 230 of the mating connector 200. The contact pin 230 of the mating connector 200 is connected to the core wire 310 of the corresponding coaxial cable 300. Thus, in the state that the electrical connector 1 and the mating connector 200 are coupled with each other, the contact pin 2 of the electrical connector 1 is electrically connected to the core wires 310 of the corresponding coaxial cable 300 through the corresponding contact pin 230 of the mating connector 200.

Further, the cylindrical portion 42 of the shell 4 of the electrical connector 1 contacts with the corresponding outer contact 240 of the mating connector 200. The outer contact 240 of the mating connector 200 is connected to the outer conductor layer 340 of the coaxial cable through the conductor components 250 and 260. Thus, in the state that the electrical connector 1 and the mating connector 200 are coupled with each other, the cylindrical portion 42 of the shell 4 of the electrical connector 1 is electrically connected to the outer conductor layer 340 of the coaxial cable 300 through the corresponding outer contact 240 of the mating connector 200.

As described above, the electrical connector 1 of the present disclosure is configured so that each of the insertion holes 33 of the cylindrical portion 31 of the housing 3 includes the flat receiving portion 34 formed on the first wall surface 331. Further, the electrical connector 1 of the present disclosure is configured so that the housing 3 includes the pair of second pressing ribs 312 respectively formed on both X-direction side surfaces of the outer peripheral surface of the cylindrical portion 31. Thus, when the housing 3 is inserted into the insertion hole 43 of the shell 4, the outer surface of the high-height portion 312*c* of the second pressing rib 312 is pressed toward the inner side by the inner peripheral surface of the insertion hole 43, and thereby the portion of the cylindrical portion 31 where the high-height portion 312*c* is formed is elastically deformed toward the inner side. As a result, the inner surface (the second wall surface 332) of the portion where the high-height portion 312*c* is formed contacts with the fourth surface 214 of the horizontally extending portion 21 from the outside and presses the contact pin 2 toward the inner side. With this configuration, the horizontally extending portion 21 is pressed onto the receiving portion 34 formed on the first wall surface 331 of the insertion hole 33. Thus, the horizontally extending portion 21 is firmly sandwiched between the receiving portion 34 of the housing 3 and the second wall surface 332. As a result, it is possible to prevent the backlash of the contact pin 2 in the X direction after the electrical connector 1 is assembled and to accurately perform the positioning of the contact pin 2 in the insertion hole 33 of the housing 3. Therefore, it is possible to reliably keep the separation distance between the pair of contact pins 2 in the X direction constant, thereby maintaining and improving the high signal transmission characteristics of the electrical connector 1.

Although the electrical connector of the present disclosure has been described with reference to the illustrated embodiment, the present disclosure is not limited thereto. Each configuration of the present disclosure can be replaced with any arbitrary configuration capable of performing the same or similar function, or arbitrary configuration can be added to each configuration of the present disclosure.

A person having ordinary skills in the art and the technique pertaining to the present disclosure may modify the configuration of the electrical connector of the present disclosure described above without meaningfully departing from the principle, the spirit and the scope of the present disclosure and the electrical connector having the modified configuration is also involved in the scope of the present disclosure.

In addition, the number and types of the components of the electrical connector shown in the drawings are merely illustrative example and the present disclosure is not necessarily limited thereto. An aspect in which any component is added or combined or any component is omitted without departing from the principle and intent of the present disclosure is also involved within the scope of the present disclosure.

Figure 25:
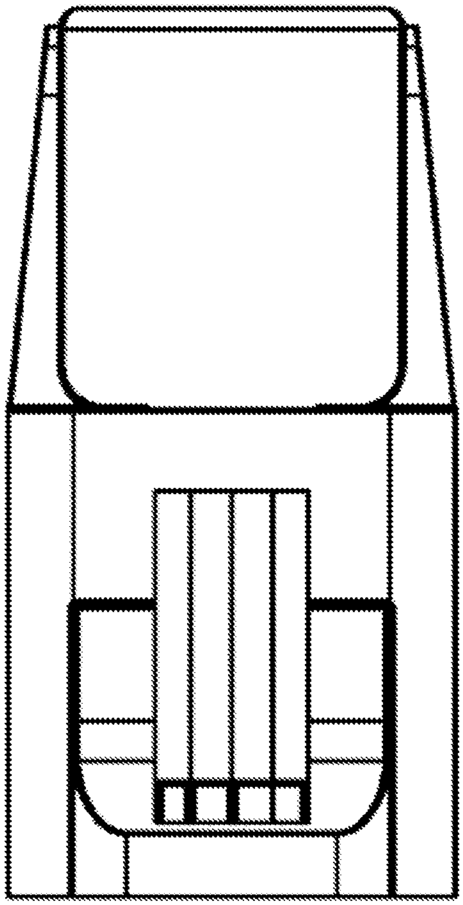
FIG. 25 is a top view of the electrical connector of the present disclosure.
Figure 26:
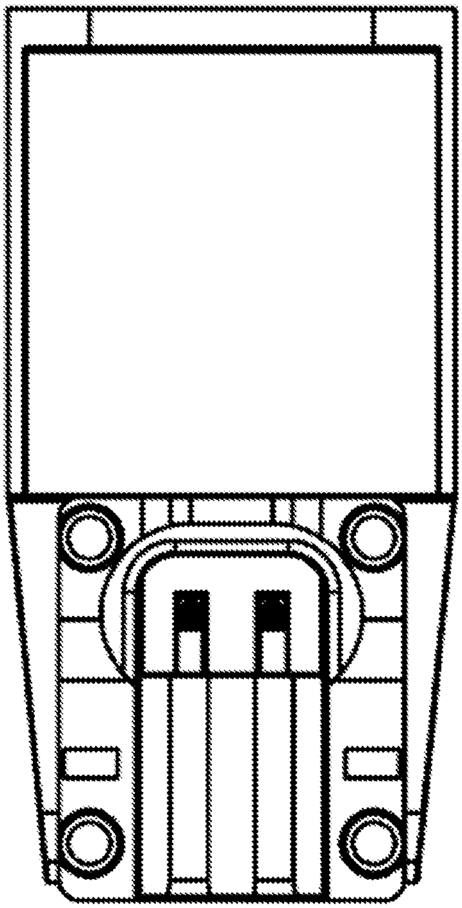
FIG. 26 is a bottom view of the electrical connector of the present disclosure.
Figure 27:
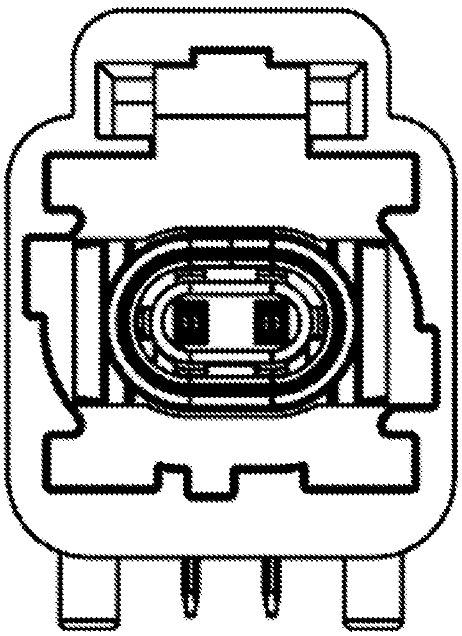
FIG. 27 is a front view of the electrical connector of the present disclosure.
Figure 28:
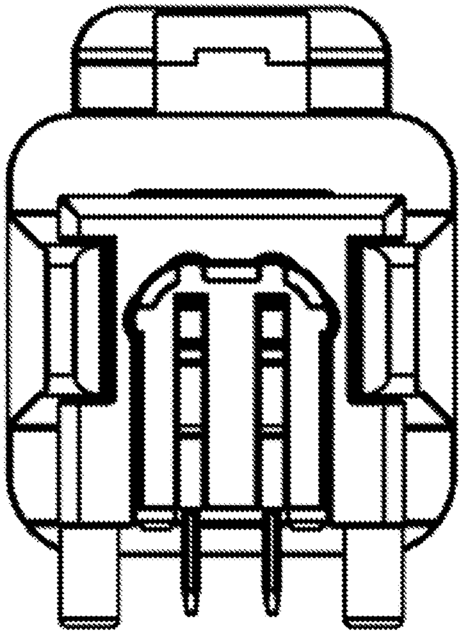
FIG. 28 is a rear view of the electrical connector of the present disclosure.
Figure 29:
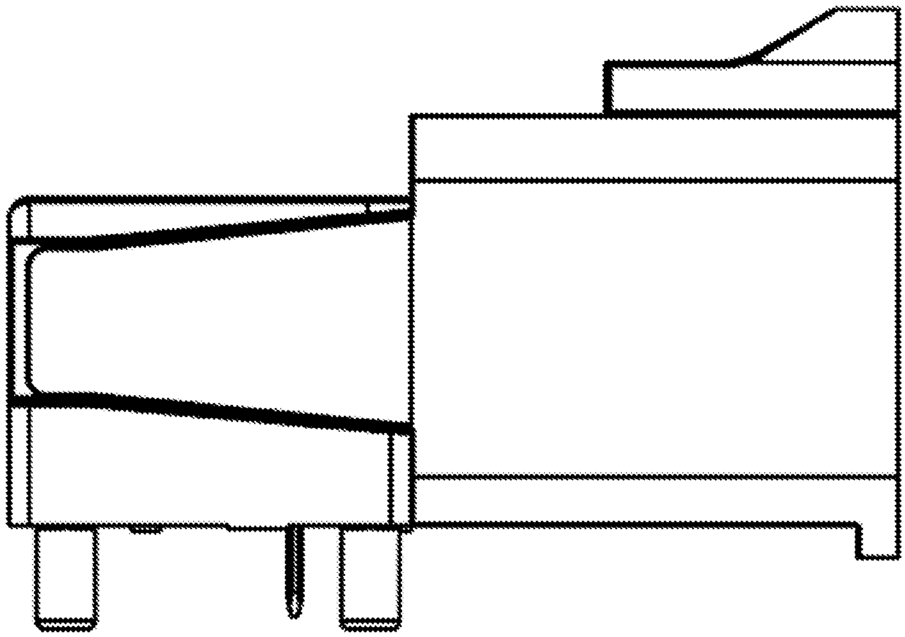
FIG. 29 is a left side view of the electrical connector of the present disclosure.
Figure 30:
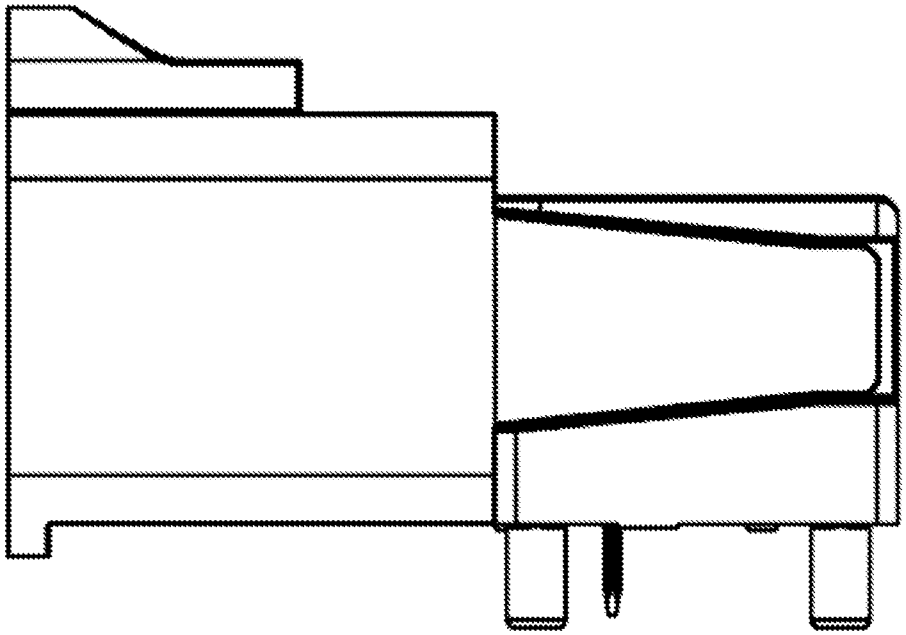
FIG. 30 is a right side view of the electrical connector of the present disclosure.

In addition, FIGS. 25 to 30 show six side views of the electrical connector according to the embodiment of the present disclosure for reference. FIG. 25 is a top view of the electrical connector of the present disclosure. FIG. 26 is a bottom view of the electrical connector of the present disclosure. FIG. 27 is a front view of the electrical connector of the present disclosure. FIG. 28 is a rear view of the electrical connector of the present disclosure. FIG. 29 is a left side view of the electrical connector of the present disclosure. FIG. 30 is a right side view of the electrical connector of the present disclosure.

The invention claimed is:

1. An electrical connector which can be coupled with a mating connector inserted from a tip side thereof, comprising:

a pair of contact pins; and an insulating housing for containing the pair of contact pins therein in a state that the pair of contact pins are insulated from each other;

wherein each of the pair of contact pins includes a horizontally extending portion which is located in the housing and linearly extends in an insertion and extraction direction of the mating connector, wherein the horizontally extending portion has a pair of surfaces which are spaced apart from each other in a width direction of the contact pin, wherein the housing includes:

a cylindrical portion which linearly extends in the insertion and extraction direction of the mating connector and contains the horizontally extending portions of the pair of contact pins therein, and a pair of rectangular insertion holes which pass through the cylindrical portion in the insertion and extraction direction of the mating connector and into which the horizontally extending portions of the pair of contact pins are respectively inserted, wherein each of the pair of insertion holes includes:

a first wall surface which faces one surface of the pair of surfaces of the horizontally extending portion, a second wall surface which faces another surface of the pair of surfaces of the horizontally extending portion, and a flat receiving portion which is formed on the first wall surface, and wherein the second wall surface of the insertion hole presses the other surface of the horizontally extending portion of the contact pin corresponding to the insertion hole toward an inner side of the insertion hole, thereby pressing the contact pin corresponding to the insertion hole onto the receiving portion of the insertion hole.

2. The electrical connector as claimed in claim 1, wherein the receiving portion includes a flat portion and a pair of leg portions which connect between both end portions of the flat portion and the first wall surface, and wherein the flat portion protrudes from the first wall surface toward the inner side of the insertion hole.

3. The electrical connector as claimed in claim 2, wherein the receiving portion has a trapezoidal shape in a planar view viewed from the insertion and extraction direction of the mating connector, wherein the flat portion linearly extends in the insertion and extraction direction of the mating connector and contacts with the one surface of the horizontally extending portion of the contact pin corresponding to the insertion hole, and wherein the pair of leg portions respectively extend in an oblique direction with respect to the flat portion and the first wall surface from both end portions of the flat portion toward the first wall surface of the insertion hole and are connected to the first wall surface.

4. The electrical connector as claimed in claim 1, wherein the housing further includes a plate-like wall portion linearly extending in the insertion and extraction direction of the mating connector between the first wall surfaces of the pair of insertion holes, and wherein the first wall surfaces of the pair of insertion holes face each other so as to be spaced apart from each other through the wall portion.

5. The electrical connector as claimed in claim 1, further comprising a metallic shell for holding the pair of contact pins and the housing, wherein the housing includes a pair of pressing ribs formed on an outer peripheral surface of the cylindrical portion so as to be respectively located at positions respectively facing the second wall surfaces of the pair of insertion holes, wherein the shell includes:

a body portion, and an insertion hole which passes through the body portion in the insertion and extraction direction of the mating connector and into which the cylindrical portion of the housing is inserted, wherein when the cylindrical portion of the housing is inserted into the insertion hole of the shell, the pair of pressing ribs of the housing are pressed by an inner surface of the insertion hole of the shell toward an inner side, and thereby portions of the cylindrical portion of the housing where the pair of pressing ribs are formed are elastically deformed toward the inner side, and wherein the second wall surfaces of the pair of insertion holes respectively press the other surfaces of the horizontally extending portions of the pair of contact pins, thereby respectively pressing the pair of contact pins onto the receiving portions of the pair of insertion holes.

6. The electrical connector as claimed in claim 5, wherein the housing further includes a downwardly extending portion which extends from a base end portion of the cylindrical portion toward a lower side, and wherein the downwardly extending portion includes a cutout portion formed at a portion adjacent to the cylindrical portion on a tip end surface of the downwardly extending portion.

7. The electrical connector as claimed in claim 6, wherein the body portion of the shell further includes an edge portion which is formed on a base side of the body portion of the shell, and wherein the cutout portion of the downwardly extending portion of the housing faces the edge portion of the shell through a gap therebetween.

8. An electrical connector which can be coupled with a mating connector inserted from a tip side thereof, comprising:

a pair of contact pins; and an insulating housing for containing the pair of contact pins therein in a state that the pair of contact pins are insulated from each other;

wherein each of the pair of contact pins includes a horizontally extending portion which is located in the housing and linearly extends in an insertion and extraction direction of the mating connector, wherein the horizontally extending portion has a pair of surfaces which are spaced apart from each other in a width direction of the contact pin, wherein the housing includes:

a cylindrical portion which linearly extends in the insertion and extraction direction of the mating connector and contains the horizontally extending portions of the pair of contact pins therein, and a pair of rectangular insertion holes which pass through the cylindrical portion in the insertion and extraction direction of the mating connector and into which the horizontally extending portions of the pair of contact pins are respectively inserted, wherein each of the pair of insertion holes includes:

a first wall surface which faces one surface of the pair of surfaces of the horizontally extending portion, and a second wall surface which faces another surface of the pair of surfaces of the horizontally extending portion, and wherein the second wall surface of the insertion hole presses the other surface of the horizontally extending portion of the contact pin corresponding to the insertion hole toward an inner side of the insertion hole, thereby pressing the contact pin corresponding to the insertion hole onto the first wall surface of the insertion hole.

* * * * *